United States Patent
Maki et al.

(10) Patent No.: US 11,558,829 B2
(45) Date of Patent: Jan. 17, 2023

(54) TRANSMITTER AND TRANSMISSION METHOD

(71) Applicant: Panasonic Intellectual Property Corporation of America, Torrance, CA (US)

(72) Inventors: Shotaro Maki, Tokyo (JP); Takashi Iwai, Ishikawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/965,769

(22) PCT Filed: Jan. 9, 2019

(86) PCT No.: PCT/JP2019/000365
§ 371 (c)(1),
(2) Date: Jul. 29, 2020

(87) PCT Pub. No.: WO2019/159568
PCT Pub. Date: Aug. 22, 2019

(65) Prior Publication Data
US 2021/0045071 A1 Feb. 11, 2021

(30) Foreign Application Priority Data
Feb. 16, 2018 (JP) .............................. JP2018-025861

(51) Int. Cl.
*H04W 52/36* (2009.01)
*H04L 5/00* (2006.01)
(Continued)

(52) U.S. Cl.
CPC ......... *H04W 52/367* (2013.01); *H04L 1/0003* (2013.01); *H04L 5/0051* (2013.01); *H04L 27/2675* (2013.01); *H04W 52/365* (2013.01)

(58) Field of Classification Search
CPC . H04L 1/0003; H04L 27/2675; H04L 5/0051; H04W 52/365; H04W 52/367;
(Continued)

(56) References Cited

U.S. PATENT DOCUMENTS

2011/0243007 A1 10/2011 Xiao
2017/0118727 A1* 4/2017 Panchal ............ H04W 72/0413
(Continued)

FOREIGN PATENT DOCUMENTS

EP 2 663 136 A1 11/2013
JP 2013-524584 A 6/2013
(Continued)

OTHER PUBLICATIONS

Extended European Search Report dated Mar. 1, 2021, for the corresponding European Patent Application No. 19754739.1, 13 pages.
(Continued)

*Primary Examiner* — Derrick V Rose
(74) *Attorney, Agent, or Firm* — Seed IP Law Group LLP

(57) ABSTRACT

The present invention provides a transmitter which can suitably perform a transmission power control in a PT-RS port. In this transmitter (100), a control unit (101) determines a transmission power for transmitting a reference signal (PT-RS) for phase tracking and a data signal within a range in which the maximum transmission power for each antenna port is not exceeded. In addition, a transmission unit
(Continued)

(105) transmits the reference signal for phase tracking and the data signal at the transmission power determined by the control unit (101).

14 Claims, 17 Drawing Sheets

(51) Int. Cl.
  *H04L 1/00* (2006.01)
  *H04L 27/26* (2006.01)
(58) Field of Classification Search
  CPC . H04W 16/28; H04W 52/325; H04W 52/346; H04B 7/0426
  See application file for complete search history.

(56) References Cited

U.S. PATENT DOCUMENTS

| | | | |
|---|---|---|---|
| 2017/0215107 A1 | 7/2017 | Kakishima et al. | |
| 2019/0140729 A1* | 5/2019 | Zhang | H04B 7/0669 |
| 2019/0182777 A1* | 6/2019 | Zhang | H04W 52/14 |
| 2020/0274585 A1* | 8/2020 | Huang | H04B 7/0456 |

FOREIGN PATENT DOCUMENTS

| | | |
|---|---|---|
| WO | 2016/017705 A1 | 2/2016 |
| WO | WO 2019112374 A1 | 6/2019 |

OTHER PUBLICATIONS

3GPP TS 38.211 V15.0.0, "3rd Generation Partnership Project; Technical Specification Group Radio Access Network; NR; Physical channels and modulation (Release 15)," Dec. 2017, 74 pages.
3GPP TS 38.214 V15.0.0, 3rd Generation Partnership Project; Technical Specification Group Radio Access Network; NR; Physical layer procedures for data (Release 15), Dec. 2017, 71 pages.
Ericsson, "On phase noise effects," R1-1612335, Agenda Item: 7.1.3.2, 3GPP TSG-RAN WG1 #87, Reno, Nevada, Nov. 14-18, 2016.
Huawei, HiSilicon, "Multi-panel based UL MIMO transmission," R1-1611665, Agenda Item: 7.1.3.1, 3GPP TSG RAN WG1 Meeting #87, Reno, U.S.A, Nov. 14-18, 2016, 3 pages.
International Search Report, dated Mar. 5, 2019, for corresponding International Application No. PCT/JP2016/000365, 4 pages.
LG Electronics, "Text proposals on UL PT-RS power boosting and DL PT-RS reception," R1-1800369, Agenda Item: 7.2.3.4, 3GPP TSG RAN WG1 Meeting AH 1801, Vancouver, Canada, Jan. 22-26, 2018, 8 pages.
NTT Docomo, "Revision of SI: Study on New Radio Access Technology," RP-161596 (Revision of RP-161214), Agenda Item: 9.2.2, 3GPP TSG RAN Meeting #73, New Orleans, Sep. 19-22, 2016, 7 pages.
Panasonic, "PT-RS design," R1-1802355, Agenda Item: 7.1.2.3.4, 3GPP TSG RAN WG1 Meeting #92, Athens, Greece, Feb. 26-Mar. 2, 2018, 3 pages.

* cited by examiner

TRANSMITTER AND TRANSMISSION METHOD

TECHNICAL FIELD

The present disclosure relates to a transmitter and a transmission method.

BACKGROUND ART

Studies have been carried out on communication systems so called the 5$^{th}$ Generation mobile communication systems (5G). In 5G, studies have been carried out on flexibly providing functions for each of use cases which require an increase in communication traffic, an increase in the number of terminals to be connected, high reliability, and low latency. Typical use cases include the following three: enhanced Mobile Broadband (eMBB); massive Machine Type Communications (mMTC); and Ultra Reliable and Low Latency Communications (URLLC). In the 3rd Generation Partnership Project (3GPP), which is an international standardization organization, further advancement of communication systems has been under study in both aspects of advancement of the LTE systems, and New Radio Access Technology (New RAT) (e.g., see Non-Patent Literature (hereinafter, referred to as "NPL") 1).

CITATION LIST

Non-Patent Literature

NPL 1
  RP-161596, "Revision of SI: Study on New Radio Access Technology," NTT DOCOMO, September 2016
NPL 2
  R1-1612335, "On phase noise effects," Ericsson, November 2016
NPL 3
  3GPP TS 38.214 V15.0.0, "NR Physical layer procedure for data (Release 15)" (2017-12)
NPL 4
  R1-1611665, "Multi-panel based UL MIMO transmission," Huawei, HiSilicon, November 2016
NPL 5
  3GPP TS 38.211 V15.0.0, "NR Physical channels and modulation (Release 15)" (2017-12)

SUMMARY

In New RAT, for example, signals of a frequency equal to or greater than 6 GHz is used as a carrier wave. In particular, when a high frequency band and high modulation order are used, error rate characteristics are degraded due to Common Phase Error (CPE) or Inter-Carrier Interference (ICI), which occurs due to a phase noise of a local oscillator (e.g., see NPL 2). In this respect, in New RAT, performing of CPE correction or ICI correction (hereinafter, may be referred to as "CPE/ICI correction") using Phase Tracking Reference Signal (PT-RS) in addition to channel equalization by receivers have been under study.

Further studies regarding transmission power control in antenna ports through which a PT-RS is transmitted (hereinafter, may be referred to as "PT-RS port") are necessary, however.

One non-limiting and exemplary embodiment of the present disclosure facilitates providing a transmitter and a transmission method each capable of appropriately performing transmission power control in a PT-RS port.

A transmitter according to one aspect of the present disclosure includes: control circuitry, which, in operation, determines a transmission power for a phase tracking reference signal (PT-RS) and a data signal within a range not exceeding a maximum transmission power for each antenna port; and transmission circuitry, which, in operation, transmits the PT-RS and the data signal with the determined transmission power.

A transmission method according to one aspect of the present disclosure includes: determining a transmission power for a phase tracking reference signal (PT-RS) and a data signal within a range not exceeding a maximum transmission power for each antenna port; and transmitting the PT-RS and the data signal with the determined transmission power.

It should be noted that general or specific embodiments may be implemented as a system, an apparatus, a method, an integrated circuit, a computer program or a recording medium, or any selective combination of the system, the apparatus, the method, the integrated circuit, the computer program, and the recording medium.

According to one exemplary embodiment of this disclosure, transmission power control in PT-RS ports can be appropriately performed.

Additional benefits and advantages of the disclosed exemplary embodiments will become apparent from the specification and drawings. The benefits and/or advantages may be individually obtained by various embodiments and features of the specification and drawings, which need not all be provided in order to obtain one or more of such benefits and/or advantages.

DESCRIPTION OF EMBODIMENTS

Figure 1:
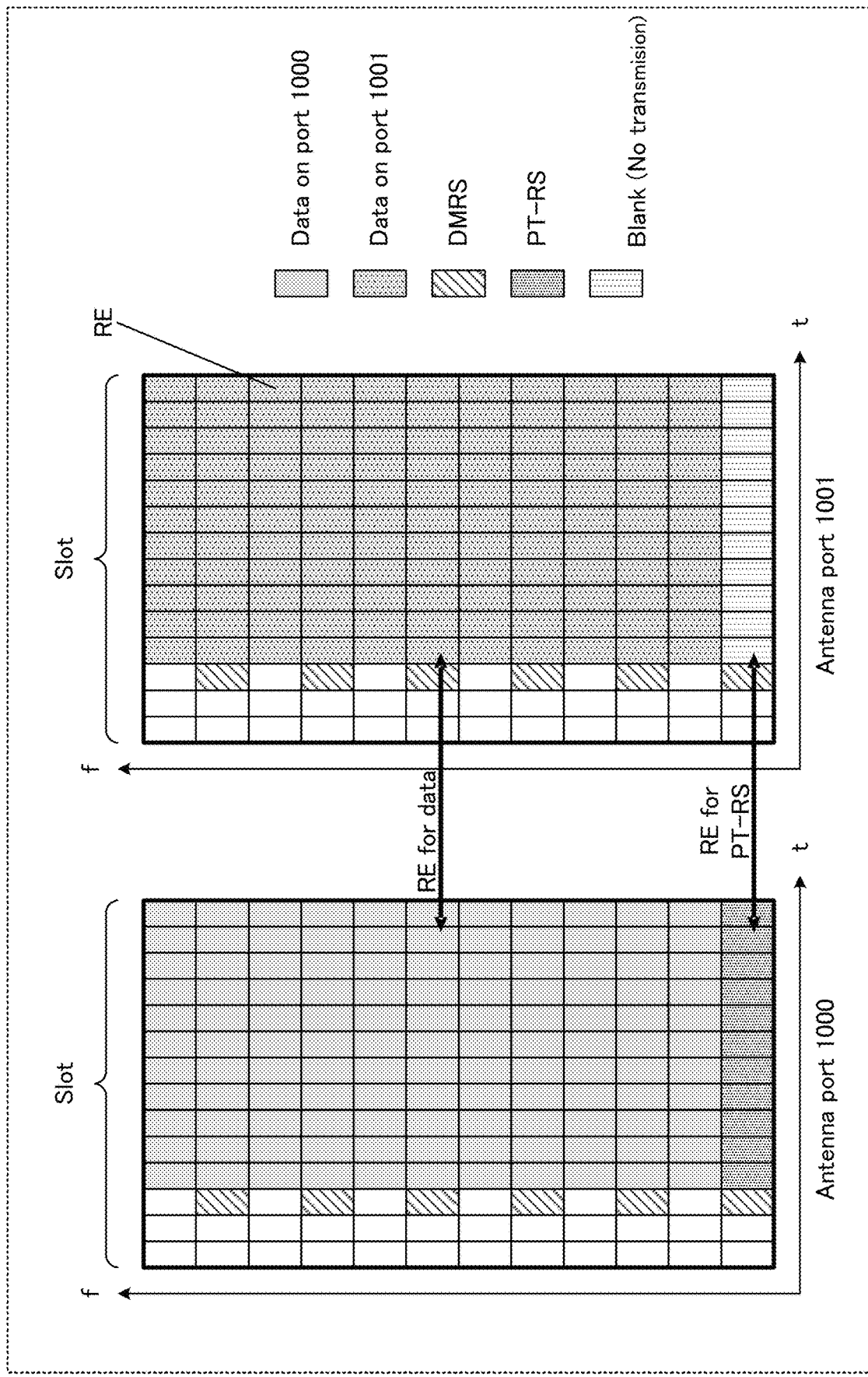
FIG. 1 is a diagram illustrating a mapping example of DMRS and PT-RS in MIMO.

Hereinafter, a detailed description will be given of embodiments of the present disclosure with reference to the accompanying drawings.

[Power Boosting]

In a case where the number of antenna ports (PT-RS ports) for transmitting PT-RS and the number of antenna ports (DMRS ports) for transmitting data and DMRS are different from each other, the transmission power per Resource Element (hereinafter, ma be referred to as "RE" and/or resource elements may be collectively referred to as "RE") of PT-RS in one antenna port may be configured to be large compared with the transmission power per RE of data in one antenna port to be transmitted and received between the same base station and mobile station. This transmission power control for PT-RS may be referred to as "power boosting." Power boosting of PT-RS improves the PT-RS reception accuracy and CPE/ICI estimation accuracy, and thus, improvement in the transmission speed/transmission efficiency can be expected.

It is also assumed that coherent transmission (full-coherent transmission), non-coherent transmission (non-coherent transmission), and partial coherent transmission (partial-coherent transmission) are supported in codebook based uplink transmission of NR. Among these transmissions, there is an opinion that power boosting of PT-RS is difficult in non-coherent transmissions and partial coherent transmissions because the upper limit of transmission power (maximum transmission power) is provided for each antenna port. However, for more accurate CPE/ICI estimation, PT-RS should be subjected to power boosting as much as possible in all transmission schemes. Therefore, a method for applying power boosting to PT-RS (PT-RS power boosting) in non-coherent transmission or partial coherent transmission needs to be discussed.

[PT-RS]

The higher the frequency band to which the signal is assigned or the higher the modulation order to be used for the signal, the greater the effect of CPE/ICI for the error rate characteristics is. Therefore, as described above, in a case where a high-frequency band and/or high modulation order is used, performing of CPE/ICI correction using PT-RS in addition to channel equalization in receivers has been discussed.

PT-RS is mapped with high density on the time domain compared with a reference signal for channel estimation (for demodulation) (Demodulation Reference Signal (DMRS)) in order to track CPE/ICI that fluctuates randomly in time. Specifically, it is assumed that PT-RS is mapped with a density of each symbol, one symbol of two adjacent symbols or one symbol of four adjacent symbols, for example. Further, because of the characteristics that the variation between CPE/ICI subcarriers is small, PT-RS is mapped with a relatively low density in frequency domain. Specifically, it is assumed that PT-RS is mapped in a density, such as one for each Resource Block (RB) (e.g., one subcarrier), one for every adjacent two RBs, or one for every adjacent four RBs.

According to the agreements regarding PT-RS in 3GPP RAN1 #88, PT-RS is used between a base station (BS, eNB, gNB) and a mobile station (terminal, UE) as indicated by higher layer signaling (e.g., RRC (Radio Resource Control) signaling) from the base station. It is also assumed that assignment densities of PT-RS in the time domain and frequency domain flexibly change depending on the modulation order or bandwidth and/or the like used between the base station and the mobile station.

In addition, a method for determining the assignment density of PT-RS (hereinafter, may be referred to as "PT-RS assignment density") by mobile stations has been discussed. As one method, there is a method in which the PT-RS assignment density is indicated from the base station by a PT-RS dedicated control signal (e.g., Downlink Control Information (DCI)) or an RRC signal) (explicit indication). As another method, there is a method in which a correspondence relationship between the PT-RS assignment density and another parameter (e.g., such as a modulation order or bandwidth) is previously determined, and a mobile station determines the PT-RS assignment density by checking the correspondence relationship with the other parameter indicated by DCI at the time of communication (implicit indication). Note that there is a possibility that a method other than these methods may be used.

Meanwhile, DMRS used for channel estimation is mapped with a high density in frequency domain and a low density in time domain compared with PT-RS, because the change in channel characteristics in in frequency domain is large and the change in time domain is not as large as phase noise. Furthermore, in order to set the timing of data demodulation earlier, the introduction of a front-loaded DMRS which is mapped in a front position of a slot is assumed in New RAT.

Further, mapping of PT-RS to the same antenna port as a certain DMRS (this port may be referred to as "PT-RS port") and application of the same precoding as a DMRS port to PT-RS have been discussed. For this reason, there is a possibility that PT-RS may be used in the receiver for channel estimation as with DMRS.

Further, there is a possibility that PT-RS is defined as a part of DMRS. In this case, DMRS used as PT-RS is mapped with a high density compared with other DMRSs in time domain and is mapped with a low density compared with other DMRSs in frequency domain. Further, the reference signal used to correct CPE/ICI generated due to phase noise may also be referred to as a term other than "PT-RS."

It is also assumed that Multiple Input Multiple Output (MIMO) is used in New RAT. That is, the base station and one or more mobile stations within a cell formed by the base station are capable of performing transmission and reception, using a plurality of antenna ports corresponding to different precoding pieces using the same time and frequency resources.

In the base station and the mobile station, there are limits on their respective maximum transmission powers. For this reason, it is assumed that the operation is performed such that the sum of the transmission powers of the plurality of antenna ports used for data transmission does not exceed the maximum value of the transmission power. Basically, it is assumed that the transmission powers for data of the antenna ports are equal to each other. Therefore, for example, in case of transmission of data or a reference signal, using one antenna port and in case of transmission of data or a reference signal, using n antenna ports, the transmission power per antenna port is considered to be n times larger in the former than that in the latter.

PT-RS is transmitted and received between the base station and each of the mobile stations in a cell formed by the base station. Herein, in a group of antenna ports (may be referred to as a DMRS port group) sharing a local oscillator of a transmitter (base station in downlink and mobile stations in uplink), the values of CPE/ICI are likely to be the same. For this reason, it is assumed that PT-RS is transmitted from any one antenna port of this group.

Furthermore, it is considered that PT-RS transmitted and received with respect to one mobile station is subjected to time/frequency/spatially orthogonal multiplexing with respect to data. Therefore, in a case where PT-RS is transmitted in a certain antenna port (a certain RE), nothing is transmitted on the RE in other antenna ports used by the mobile station. In other words, in a certain RE, power is used for PT-RS in one antenna port, and no power is used (nothing is transmitted) at all in the other antenna ports.

In New RAT, the following transmission power control, i.e., "PT-RS power boosting" has been under discussion. In this transmission power control, the transmission power per RE of one antenna port for PT-RS is made larger than the transmission power per RE of one antenna port for data, using the power of resources not used by the other antenna ports, by the amount of power of the not used resources.

As an example, FIG. 1 illustrates a mapping example of DMRS, PT-RS and data in MIMO. In RE (symbol×subcarrier) at the lowermost subcarrier of FIG. 1, PT-RS is transmitted in antenna port 1000. At this time, in the same RE group (i.e., the lowest subcarrier) as the RE group on which PT-RS is transmitted in antenna port 1000, nothing is transmitted in antenna port 1001 (blank).

Figure 2:
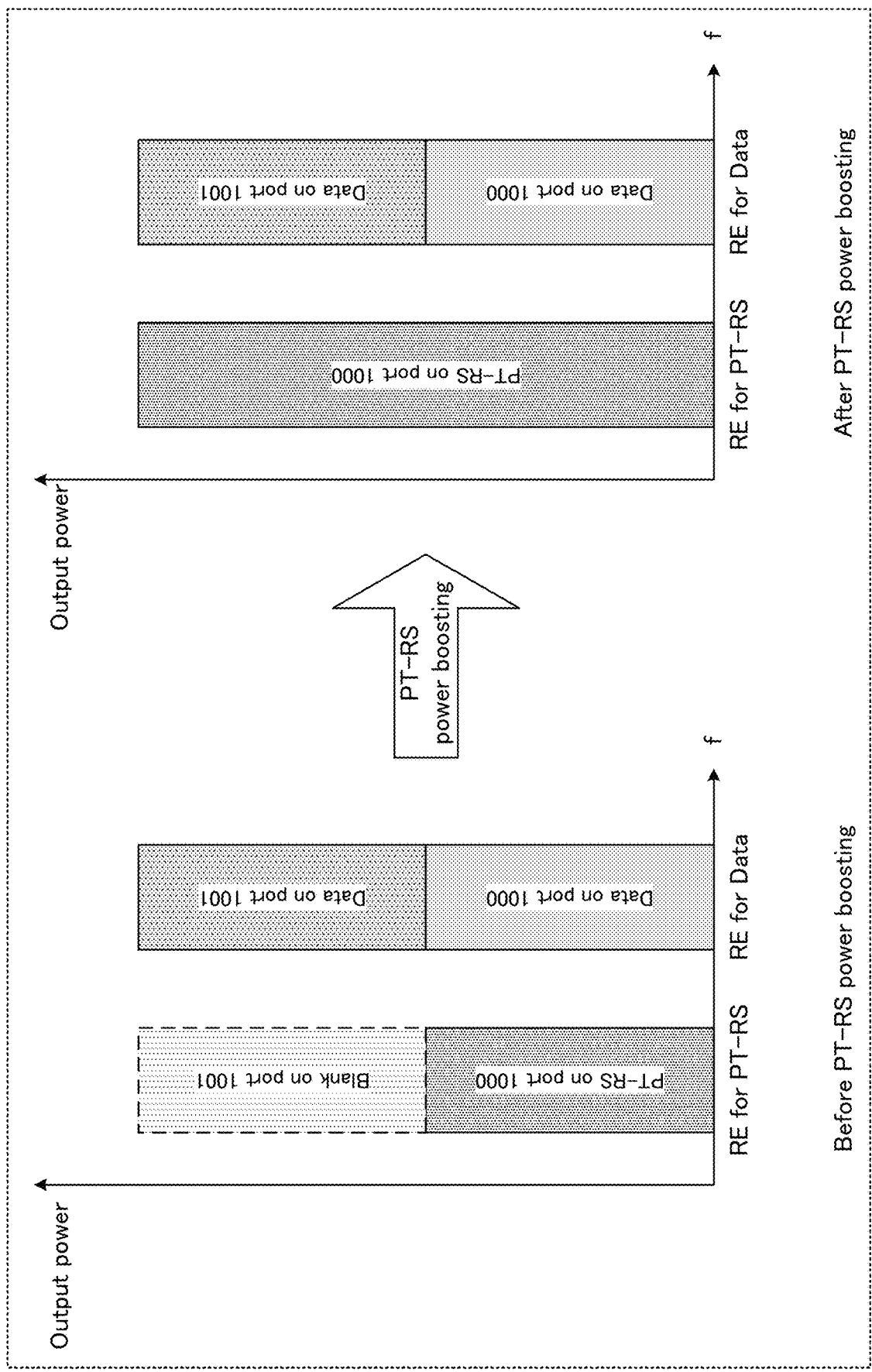
FIG. 2 is a diagram illustrating an exemplary power boosting.

FIG. 2 illustrates an example of transmission power allocation in RE of each of antenna ports 1000 and 1001 before and after PT-RS power boosting is performed. In the example illustrated in FIG. 2, antenna port 1000 adds (power boosting) the power of RE not used in antenna port 1001 to PT-RS and transmits the PT-RS. Therefore, after PT-RS power boosting, as illustrated in FIG. 2, not only the RE on which PT-RS is transmitted but also the transmission power of the entire antenna port 1000 becomes larger than the transmission power of antenna port 1001.

According to the description of uplink PT-RS power boosting in NPL 3, herein, when PT-RS is transmitted in one antenna port (one PT-RS port) in uplink, the ratio representing "how many times the power of data is the power of PT-RS" for every RE in PT-RS port is, $\rho_{PTRS,i}$, and is obtained by the following equation.

[Equation 1]

$$\rho_{PTRS,i} = -10 \log_{10}(n_{layer}^{PUSCH}) \quad (1)$$

In Equation 1, $n_{layer}^{PUSCH}$ represents the number of layers of transmission data configured in the base station (i.e., the receiver).

[Precoding of Transmitter]

For uplink transmission of New RAT, two transmission methods (e.g., codebook based transmission (codebook based UL transmission) and non-codebook based transmission (non-codebook based UL transmission) are assumed (e.g., see NPL 3). In codebook based transmission, the number of available precoding matrices differs depending on the type of coherent transmission that can be supported by the mobile station. It is assumed that the types of the capability of the mobile station (UE capability) for coherent transmission are divided into the following three.

fullAndPartialAndNonCoherent
partialAndNonCoherent
Non-Coherent

The first one, which is "fullAndPartialAndNonCoherent," indicates the presence of the capability of supporting all types of coherent transmissions. The second one, which is "partialAndNonCoherent," indicates the presence of the capability of supporting partial coherent transmission and non-coherent transmission. The third one, which is "Non-Coherent," indicates the presence of the capability of supporting only non-coherent transmission.

"Non-coherent transmission," herein, is a transmission scheme in which independent precoding is applied to different antenna panels in a transmitter in which a plurality of non-uniform antenna panels are implemented (e.g., see NPL 4). In this case, data on different layers is transmitted from different panels. "Coherent transmission" is a transmission scheme in which data on all layers can be transmitted from all antenna panels, respectively, in a transmitter in which uniform antenna panels are implemented. Further, "partial coherent transmission" is a transmission method in which data of a part of a layer group is transmitted from a part of an antenna panel group, and data on other layers is transmitted from the remaining part of the antenna panel group.

Table 1 indicates a precoding matrix assumed to be available when the number of layers is two and the number of antenna ports is two (e.g., see is NPL 5). It is assumed that all matrices in Table 1 are available for coherent transmission while only the leftmost matrix in Table 1 is available for non-coherent transmission.

TABLE 1

| TPMI index | W (ordered from left to right in increasing order of TPMI index) | | |
|---|---|---|---|
| 0-2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

Figure 3:
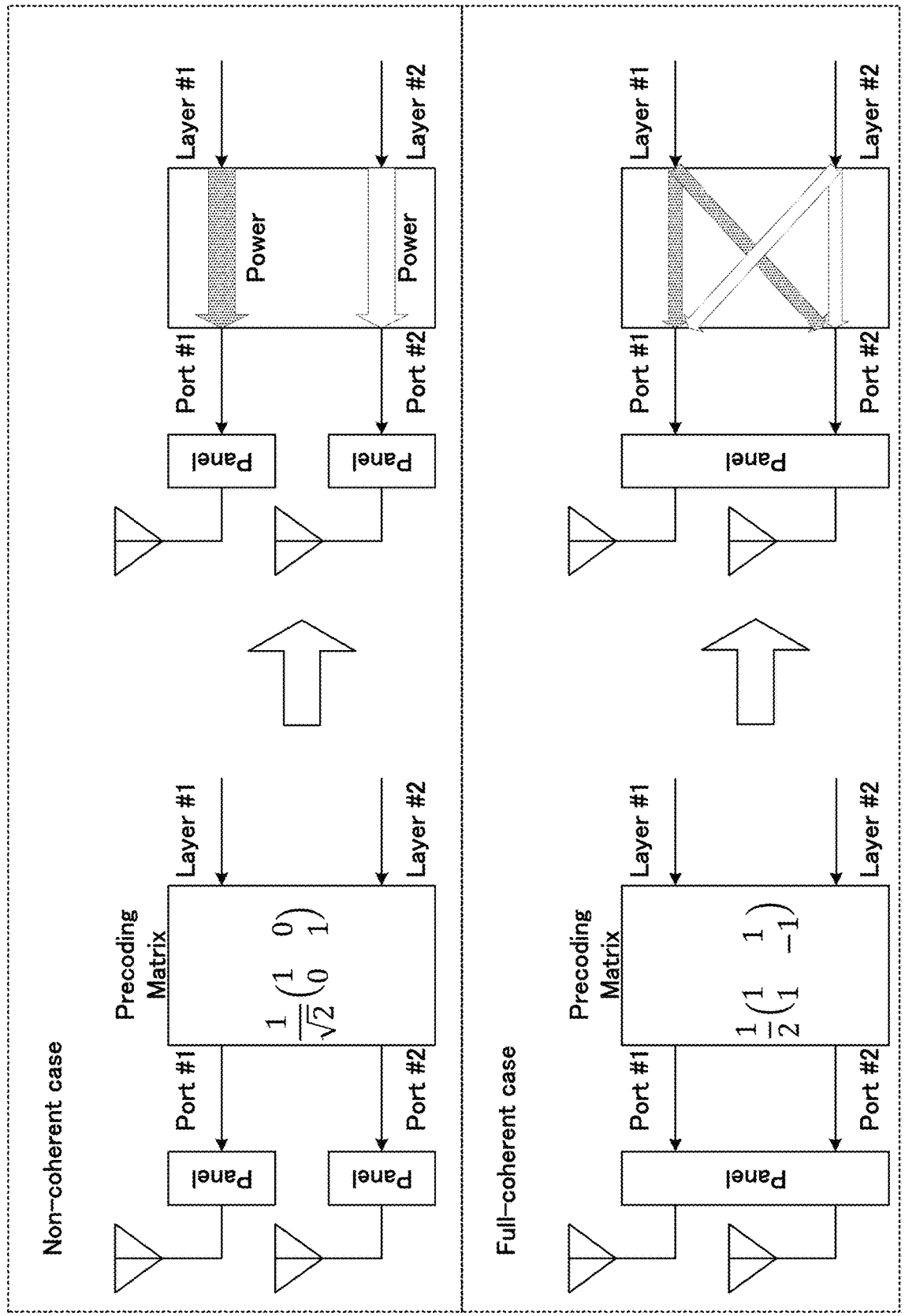
FIG. 3 is a diagram illustrating an exemplary non-coherent transmission and coherent transmission.

FIG. 3 shows examples of non-coherent transmission and coherent transmission. As illustrated in FIG. 3, in non-coherent transmission, the data of the respective layers (Layer #1 and #2) are transmitted from independent panels by the precoding matrix.

Figure 4:
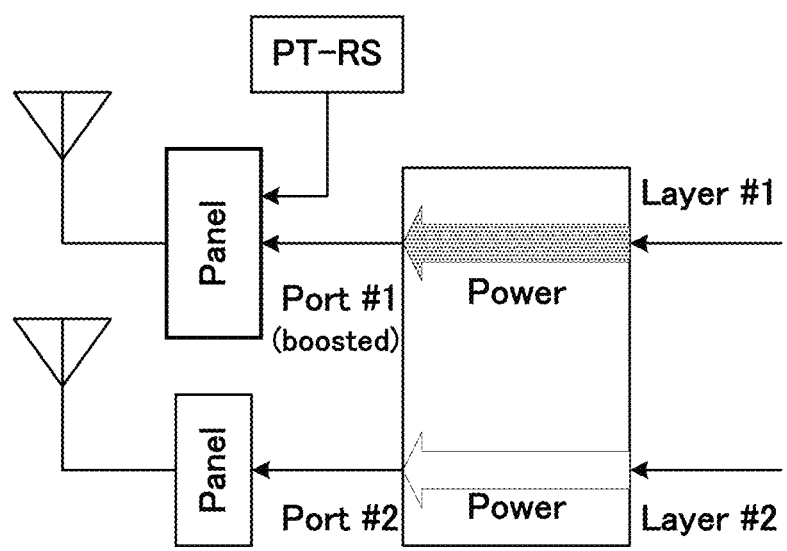
FIG. 4 is a diagram illustrating a PT-RS transmission example in non-coherent transmission.

FIG. 4 illustrates a transmission example of a case where PT-RS is transmitted in non-coherent transmission. As described above, PT-RS may be transmitted in some of the antenna ports (Port #1 in FIG. 4). Thus, for non-coherent transmission (or partial coherent transmission), the transmission power of the panel transmitting PT-RS (panel corresponding to Port #1 in FIG. 4) may be greater than the transmission power of the other panel (panel corresponding to Port #2 in FIG. 4). Furthermore, when PT-RS illustrated in FIG. 4 is subjected to power boosting, the transmission power of the panel may exceed the transmittable power as a capability. As a result, the signal including PT-RS may be distorted or PT-RS may not be transmitted with the intended power, resulting in degradation of CPE/ICI estimation accuracy, which possibly causes degradation of data transmission efficiency.

Accordingly, in one aspect of the present disclosure, a description will be given of a method for appropriately performing a transmission power control (including power boosting) for PT-RS in non-coherent transmission or partial coherent transmission, thereby improving the CPE/ICI estimation accuracy and improving the data transmission efficiency.

[Signal Waveforms]

In New RAT, use of a Cyclic Prefix-Orthogonal Frequency Division Multiplexing (CP-OFDM) scheme in downlink (direction from a base station to a mobile station) is assumed. Meanwhile, both the CP-OFDM scheme and Discrete Fourier Transform-Spread OFDM (DFT-S-OFDM) scheme in uplink (direction from a mobile station to a base station) have been discussed, and it is assumed that the communication schemes are used while they are switched so as to match the communication environment.

[PHR]

In New RAT, transmission of remaining transmission power information (PHR: Power Headroom Report) as in LTE in uplink transmission is assumed. That is, the mobile station, which is the transmitter, reports the value obtained by subtracting the transmission power for the actual data from the maximum transmission power of the mobile station to the base station, as PHR. However, the value of PHR is not the remaining transmission power of each antenna port, and the value of PHR is the value as the entire mobile station as a result of aggregating all antenna ports.

Embodiment 1

[Overview of Communication System]

A communication system according to the present embodiment includes transmitter 100 and receiver 200. That is, in uplink, the transmitter is a mobile station and the receiver is a base station. In downlink, the transmitter is a base station and the receiver is a mobile station.

Figure 5:
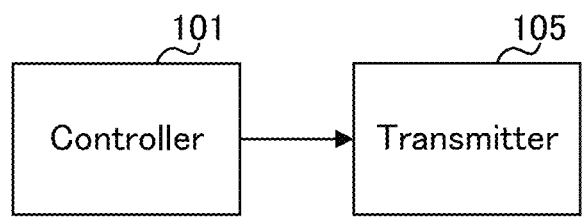
FIG. 5 is a block diagram illustrating a configuration of a part of a transmitter according to Embodiment 1.

FIG. 5 is a block diagram illustrating a configuration of a part of transmitter 100 according to the present embodiment. In transmitter 100 illustrated in FIG. 5, controller 101 determines the transmission power for phase tracking reference signal (PT-RS) and the data signal within a range not exceeding the maximum transmission power for each antenna port, and transmitter 105 transmits PT-RS and the data signal with the determined transmission power.

[Configuration of Transmitter]

Figure 6:
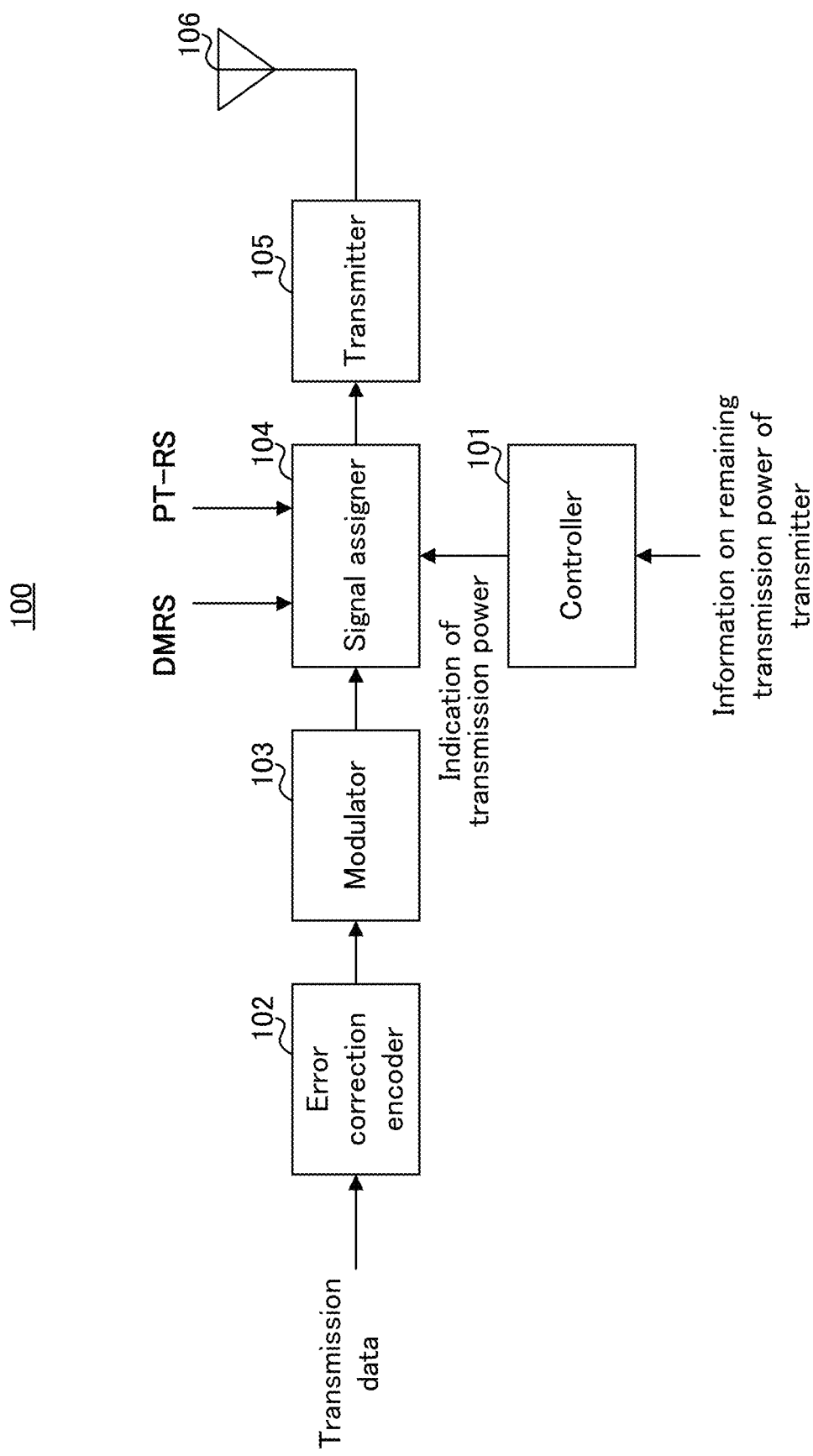
FIG. 6 is a block diagram illustrating a configuration of the transmitter according to Embodiment 1.

FIG. 6 is a block diagram illustrating a configuration of transmitter 100 according to the present embodiment. In FIG. 6, transmitter 100 includes controller 101, error correction encoder 102, modulator 103, signal assigner 104, transmitter 105, and antenna 106.

Information such as the remaining transmission power of transmitter 100 is inputted to controller 101. Controller 101 determines the transmission power for data or PT-RS and/or the like based on this information and/or the like. Then, controller 101 outputs the transmission power information indicating the determined transmission power to signal assigner 104.

Error correction encoder 102 applies error correction coding on the transmission data signal to be inputted and outputs the data signal after the error correction coding to modulator 103.

Modulator 103 applies modulation processing to the signal to be inputted from error correction encoder 102, and outputs the data signal after the modulation to signal assigner 104.

Signal assigner 104 maps DMRS, PT-RS, or the data signal to be inputted from modulator 103 to the time and frequency domain, and outputs signal after the mapping to transmitter 105. At this time, signal assigner 104 configures the transmission power for each signal based on the transmission power information to be inputted from controller 101.

Transmitter 105 applies radio transmission processing, such as frequency conversion using a carrier wave, to the signal to be inputted from signal assigner 104, and outputs the signal after the radio transmission processing to antenna 106.

Antenna 106 radiates the signal to be inputted from transmitter 105 toward receiver 200.

[Configuration of Receiver]

Figure 7:
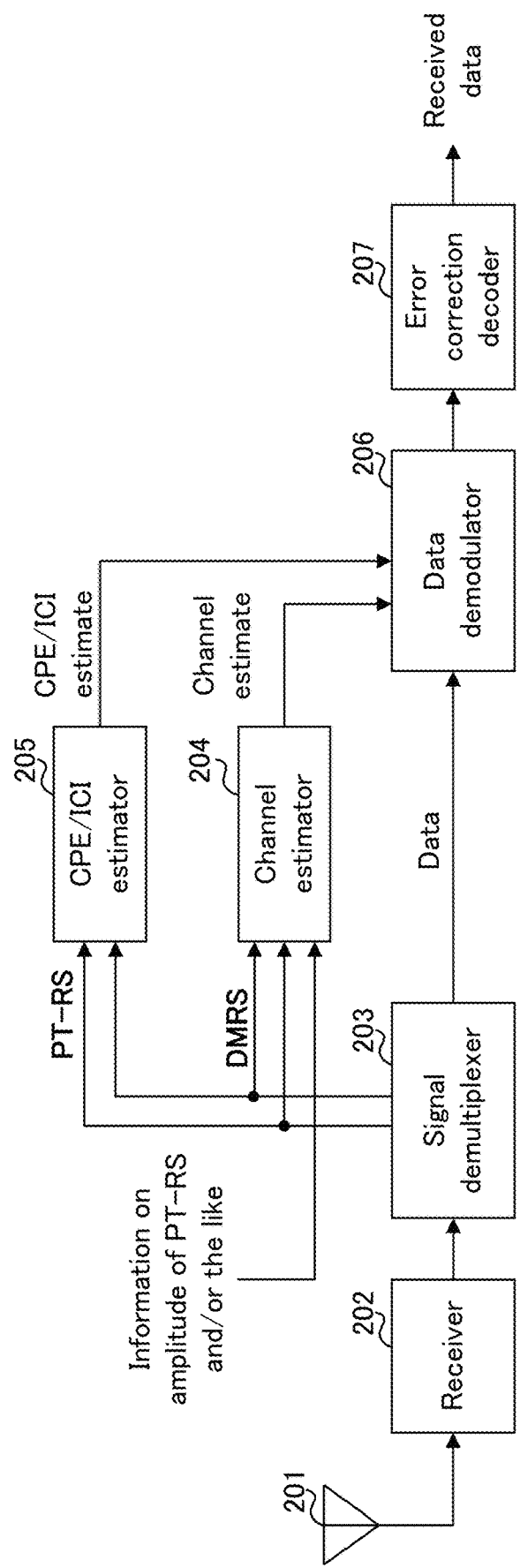
FIG. 7 is a block diagram illustrating a configuration of a receiver according to Embodiment 1.

FIG. 7 is a block diagram illustrating a configuration example of receiver 200 according to the present embodiment. In FIG. 7, receiver 200 includes antenna 201, receiver 202, signal demultiplexer 203, channel estimator 204, CPE/ICI estimator 205, data demodulator 206, and error correction encoder 207.

Antenna 201 receives the signal transmitted from transmitter 100 (see FIG. 6) and outputs the received signal to receiver 202.

Receiver 202 applies radio reception processing, such as frequency conversion to the received signal to be inputted from antenna 201, and outputs the signal after the radio reception processing to signal demultiplexer 203.

Signal demultiplexer 203 identifies the positions of the time and frequency domain to which the data signal, DMRS, and PT-RS in the signal to be inputted from receiver 202 are mapped, and demultiplexes the data signal, DMRS, and PT-RS. Signal demultiplexer 203 outputs the data signal in the demultiplexed signal to data demodulator 206, and outputs DMRS to channel estimator 204 and CPE/ICI estimator 205, and outputs PT-RS to channel estimator 204 and CPE/ICI estimator 205.

Channel estimator 204 performs channel estimation, using DMRS to be inputted from signal demultiplexer 203, and outputs a channel estimate (channel information) to data demodulator 206. Note that, channel estimator 204 may perform channel estimation, using PT-RS to be inputted from signal demultiplexer 203. In this case, channel estimator 204 may perform channel estimation based on PT-RS, using information about the amplitude of PT-RS to be inputted (e.g., the amplitude (power) ratio of PT-RS to be transmitted from transmitter 100 and the data signal).

CPE/ICI estimator 205 estimates CPE/ICI, using PT-RS and DMRS to be inputted from signal demultiplexer 203, and outputs the CPE/ICI estimate to data demodulator 206.

Data demodulator 206 demodulates the data signal to be inputted from signal demultiplexer 203, using a channel estimate to be inputted from channel estimator 204 and a CPE/ICI channel estimate to be inputted from CPE/ICI estimator 205. Data demodulator 206 outputs a demodulation signal to error correction decoder 207.

Error correction decoder 207 decodes the demodulation signal to be inputted from data demodulator 206 and outputs the resultant received data signal.

[Operations of Transmitter 100 and Receiver 200]

Next, operations of transmitter 100 and receiver 200 will be described in detail.

Figure 8:
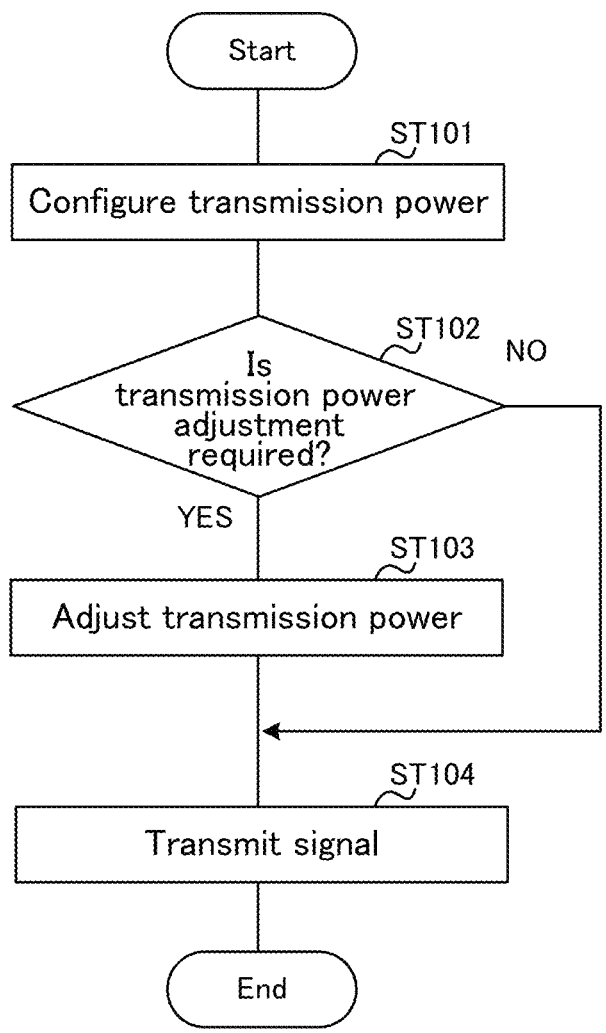
FIG. 8 is a flowchart illustrating an operation of the transmitter according to Embodiment 1.

FIG. 8 is a flowchart illustrating the processing flow of transmitter 100.

Note that transmitter 100 performs, for example, non-coherent transmission or partial coherent transmission.

First, transmitter 100 (controller 101) configures the transmission power for PT-RS and the data signal (DMRS) (ST101). At this time, transmitter 100 may configure the defined transmission power for the data signal and apply power boosting to PT-RS.

Next, transmitter 100 (controller 101) determines whether or not adjustment of the configured transmission power is required (ST102). For example, transmitter 100 determines that adjustment of the transmission power is required in a case where the remaining power for transmitting the signal (PT-RS and data signal) with the transmission power configured in ST101 is not sufficient in the antenna port (PT-RS port) from which the PT-RS is transmitted.

When adjustment of the transmission power is not required (ST102: NO), transmitter 100 proceeds to processing of ST104.

Meanwhile, in a case where adjustment of the transmission power is required (ST102: YES), transmitter 100 (controller 101) adjusts the transmission power such that the transmission power does not exceed the maximum transmission power for each antenna port (i.e., to be equal to or less than the maximum transmission power) (ST103). That is, transmitter 100 reduces the transmission power such that the transmission power does not exceed the maximum transmission power for each antenna port in a case where the remaining power for transmitting the signal with the configured transmission power is not sufficient.

Then, transmitter 100 (transmitter 105) transmits the signal from each antenna port with the transmission power configured in ST101 or the transmission power adjusted in ST103 (ST104).

Next, a detailed description will be given of Operation Examples 1 to 5 of the transmission power adjustment (ST103 in FIG. 8) by transmitter 100 in a case where the remaining transmission power for transmitting the signal with the configured transmission power is not sufficient.

Note that, hereinafter, a description will be given, as an example, of a case where data (DMRS) and PT-RS are assigned in antenna port 1000, and data (DMRS) is assigned in antenna port 1001. Transmitter 100 also applies power boosting to PT-RS in non-coherent or partial coherent transmissions, for example, using a high frequency band and high modulation order.

In addition, the left sides of FIGS. 9 to 13 illustrate the transmission power for each RE to be configured for the data and PT-RS at each of antenna ports 1000 and 1001 before (before adjustment) reducing the transmission power, and the right sides of FIGS. 9 to 13 illustrate the transmission power for each of antenna ports 1000 and 1001 after (after adjustment) reducing the transmission power, and the transmission power for each RE of the data and PT-RS.

Operation Example 1

First, transmitter 100, at the i-th PT-RS port, $\rho_{PTRS,i}$ is the ratio representing "how many times the power for data is the power for PT-RS" for every RE, and is determined by the following equation.

[Equation 2]

$$\rho_{PTRS,i} = -10 \log_{10}(N_{PTRS} \times n_{DMRS}^{PTRS,i}) \quad (2)$$

Herein, $N_{PTRS}$ indicates the number of PT-RS ports (the # of PT-RS ports configured with the TX) configured for transmitter 100. Further, $n_{DMRS}^{PTRS,i}$ indicates the number of DMRS ports belonging to the DMRS port group associated with the i-th PT-RS port (the # of DMRS ports associated with PT-RS port i). For example, in the example illustrated in FIG. 9, $N_{PTRS}=1$, and $n_{DMRS}^{PTRS,i}=2$.

Note that, transmitter 100 may calculate the ratio $\rho_{PTRS,i}$ using Equation 1 instead of Equation 2.

Transmitter 100 then reduces (adjust) the transmission power for the signal such that the transmission power does not exceed the maximum transmission power for each antenna port.

Figure 9:
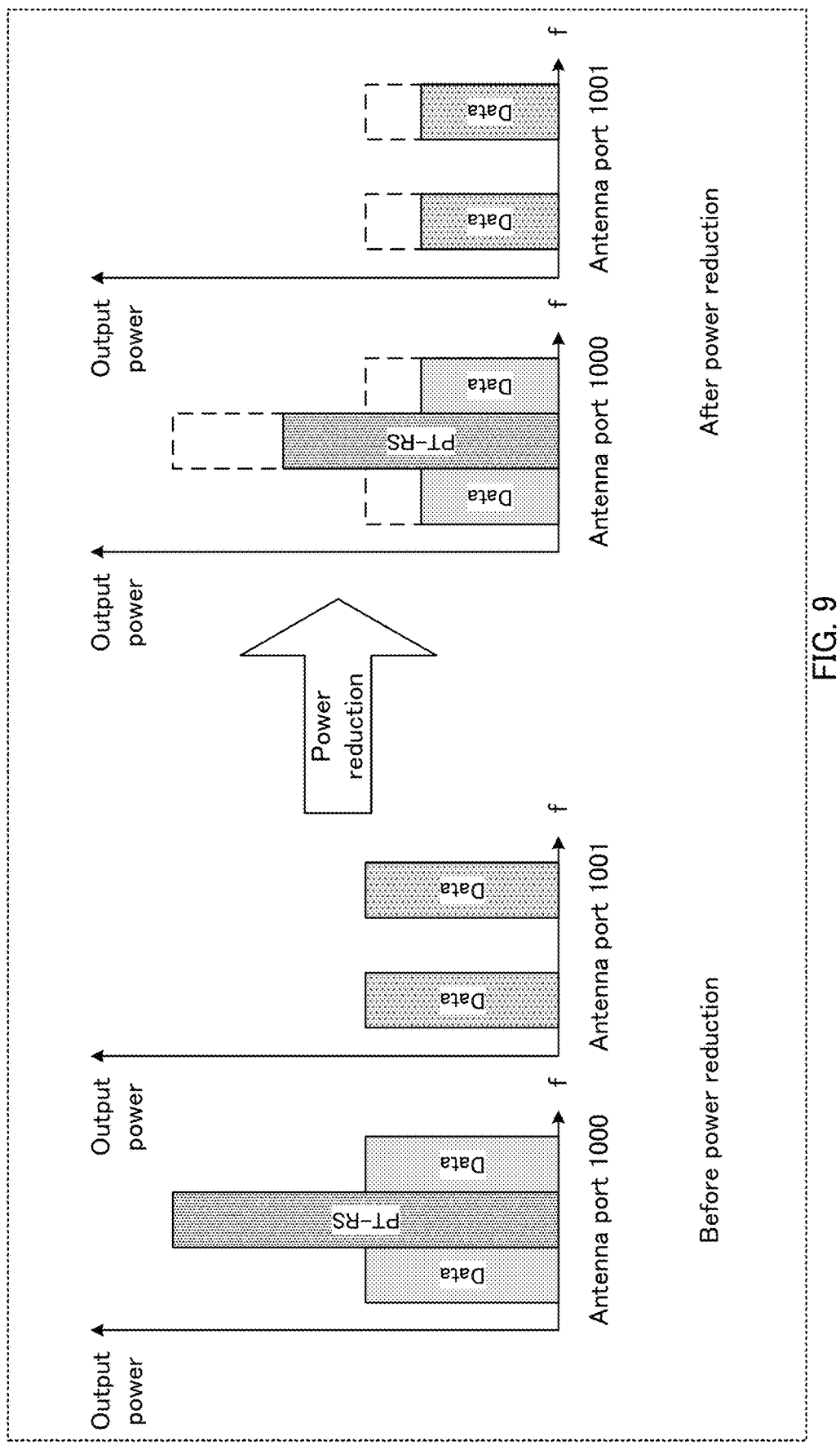
FIG. 9 is a diagram illustrating an exemplary transmission power adjustment according to Operation Example 1 of Embodiment 1.

FIG. 9 illustrates an example of the transmission power adjustment in Operation Example 1.

As illustrated in FIG. 9, transmitter 100 reduces the transmission power for the PT-RS and data signal to be transmitted from all antenna ports 1000 and 1001 while maintaining the power ratio $\rho_{PTRS,i}$ between the data and PT-RS before and after the adjustment. That is, transmitter 100 makes a reduction for the PT-RS and data signal of antenna port 1000, which is the PT-RS port, as well as the transmission power of the data signal of antenna port 1001, which is the other antenna port.

Thus, even after adjustment of the transmission power, the transmission power of the data becomes constant (the same) between antenna port, so that transmitter 100 can fairly transmit the data on all the antenna ports.

In addition, since the ratio of the transmission power between the data and PT-RS does not change before and after adjustment of the transmission power, the reception processing using the ratio is not affected.

Further, in a case where receiver 200 receives the information indicating that "the remaining power for performing transmission with the configured transmission power in the PT-RS antenna port of transmitter 100 is not sufficient," receiver 200 may estimate the amplitude (power) ratio between PT-RS and the data from this information and perform channel estimation, using the PT-RS based on the estimated ratio.

Operation Example 2

Figure 10:
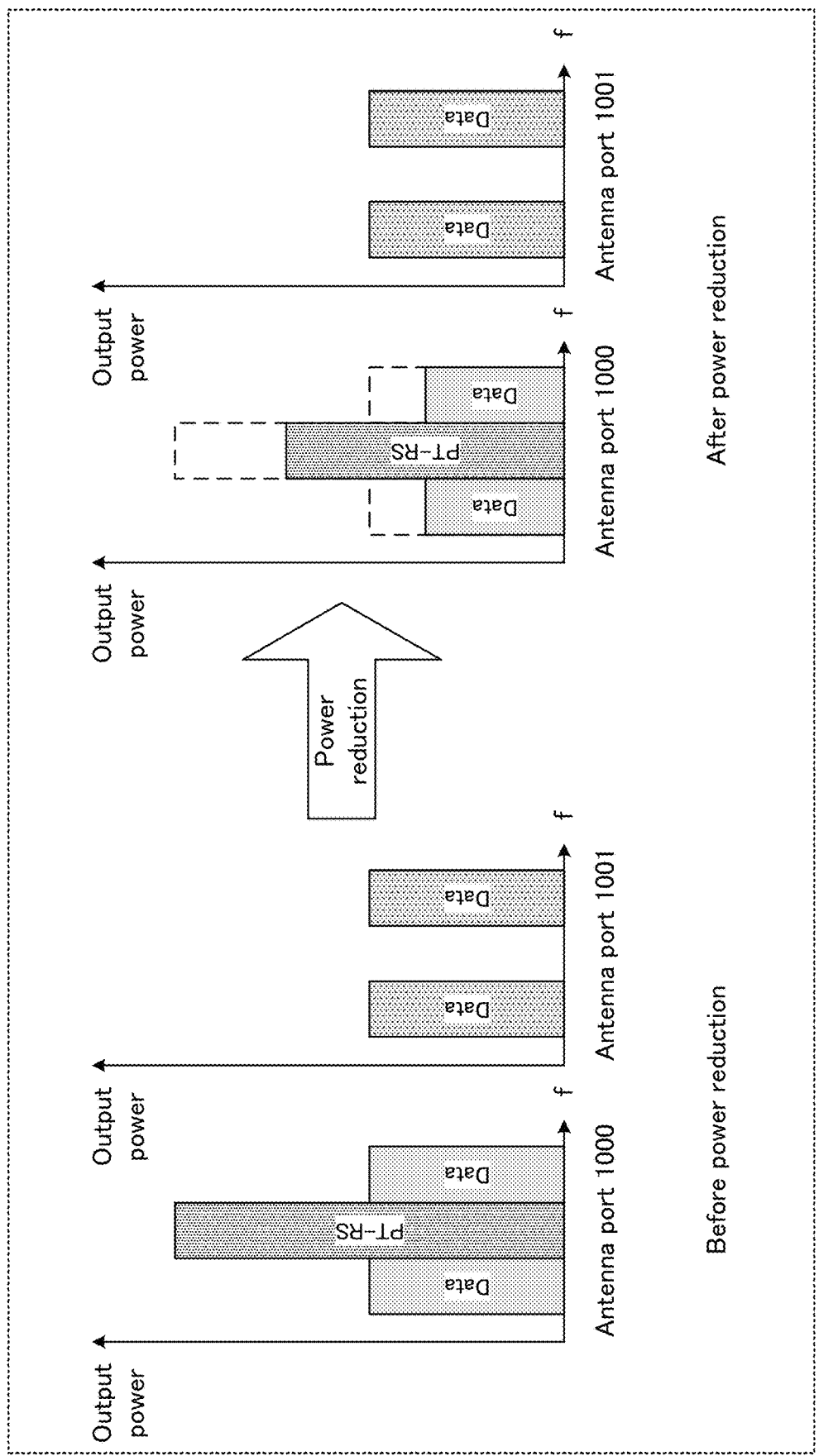
FIG. 10 is a diagram illustrating an exemplary transmission power adjustment according to Operation Example 2 of Embodiment 1.

FIG. 10 illustrates an example of transmission power adjustment in Operation Example 2.

As illustrated in FIG. 10, transmitter 100 reduces the transmission power for the PT-RS and data signal transmitted in PT-RS port (antenna port 1000) while maintaining the power ratio $\rho_{PTRS,i}$ between the data and PT-RS before and after the adjustment. That is, transmitter 100 does not reduce the transmission power in antenna port 1001 which is not a PT-RS port, although transmitter 100 reduces the transmission power in the PT-RS port.

As a result, in the PT-RS port, the ratio of the transmission power between the data and PT-RS does not change before and after adjustment of the transmission power, so that the reception processing using the ratio is not affected.

Further, in the antenna ports other than PT-RS ports, since the transmission power of the data is not reduced, it is made possible to prevent degradation of the reception accuracy of data in receiver 200.

Operation Example 3

Figure 11:
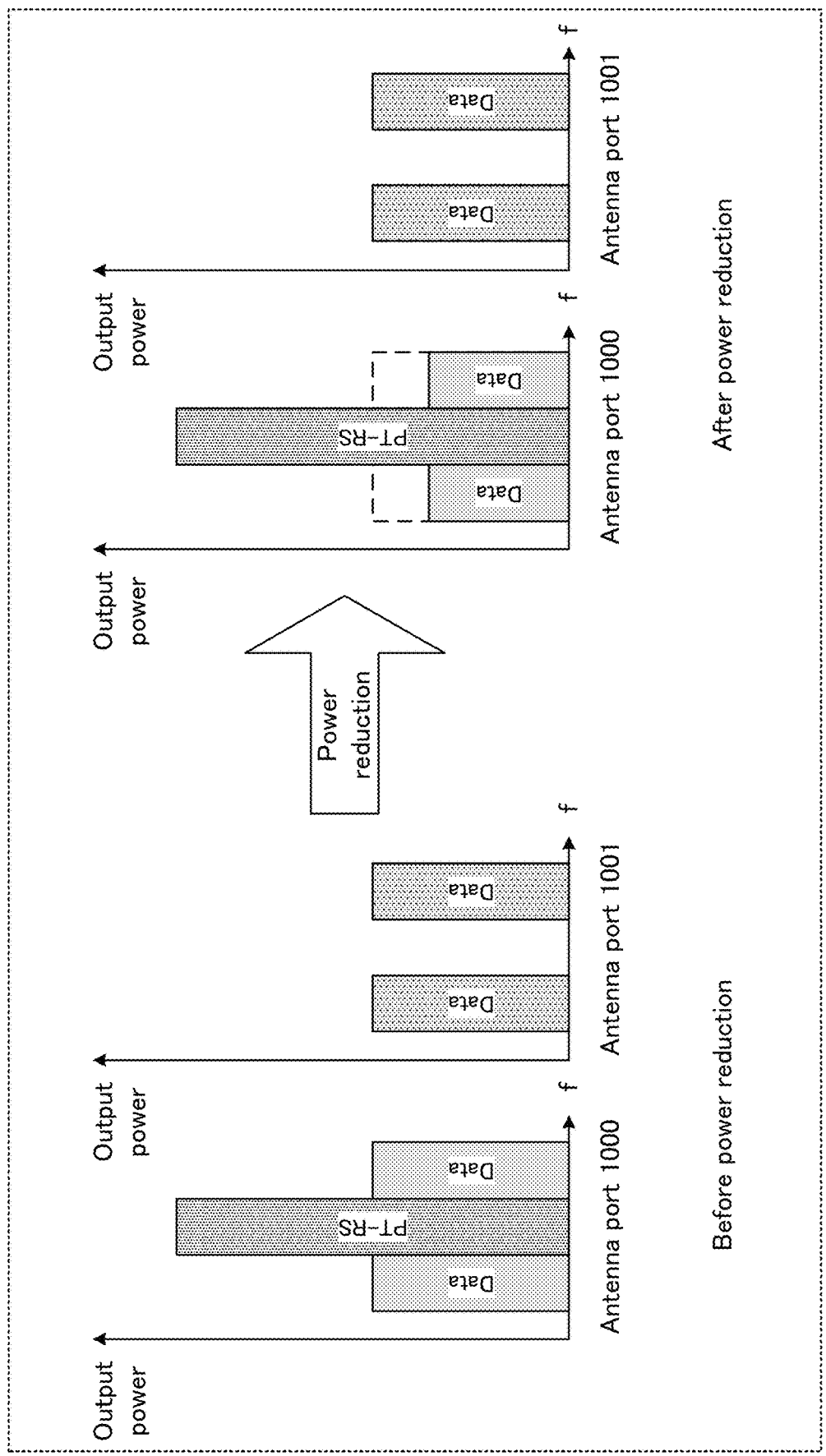
FIG. 11 is a diagram illustrating an exemplary transmission power adjustment according to Operation Example 3 of Embodiment 1.

FIG. 11 illustrates an example of transmission power adjustment in Operation Example 3.

As illustrated in FIG. 11, transmitter 100 reduces the transmission power for the data in the PT-RS port (antenna port 1000) while maintaining the transmission power for PT-RS without reduction. More specifically, in Operation Example 3, transmitter 100 does not maintain the power ratio $\rho_{PTRS,i}$ between the data and PT-RS before adjustment.

As a result, the transmission power for PT-RS is not reduced in the PT-RS port, so that it is made possible to prevent degradation of the reception accuracy of PT-RS in receiver 200.

Operation Example 4

Figure 12:
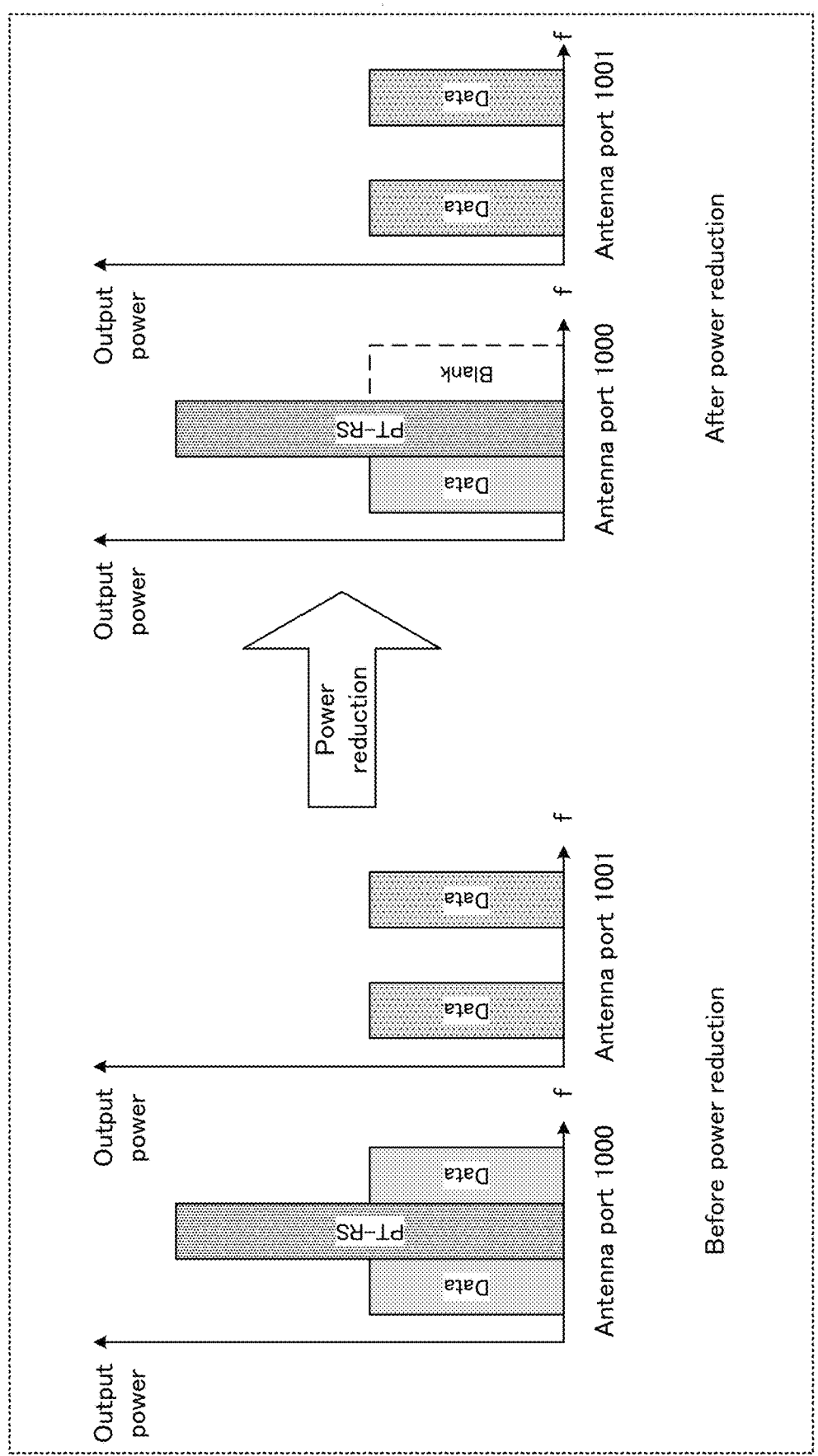
FIG. 12 is a diagram illustrating an exemplary transmission power adjustment according to Operation Example 4 of Embodiment 1.

FIG. 12 illustrates an example of transmission power adjustment in Operation Example 4.

As illustrated in FIG. 12, transmitter 100 reduces the transmission power by transmitting nothing on some RE of the RE to which the data is mapped in the PT-RS port (antenna port 1000). That is, in Operation Example 4, transmitter 100 reduces the transmission power on some RE to which the data signal has been mapped, and maintains the transmission power for the PT-RS and the data signal mapped to another part of the RE without reduction.

As a result, since the transmission power for PT-RS and data in the RE to be actually transmitted from transmitter 100 is not reduced in the PT-RS port, it is made possible to prevent degradation of the reception accuracy of PT-RS and data in receiver 200.

Operation Example 5

Figure 13:
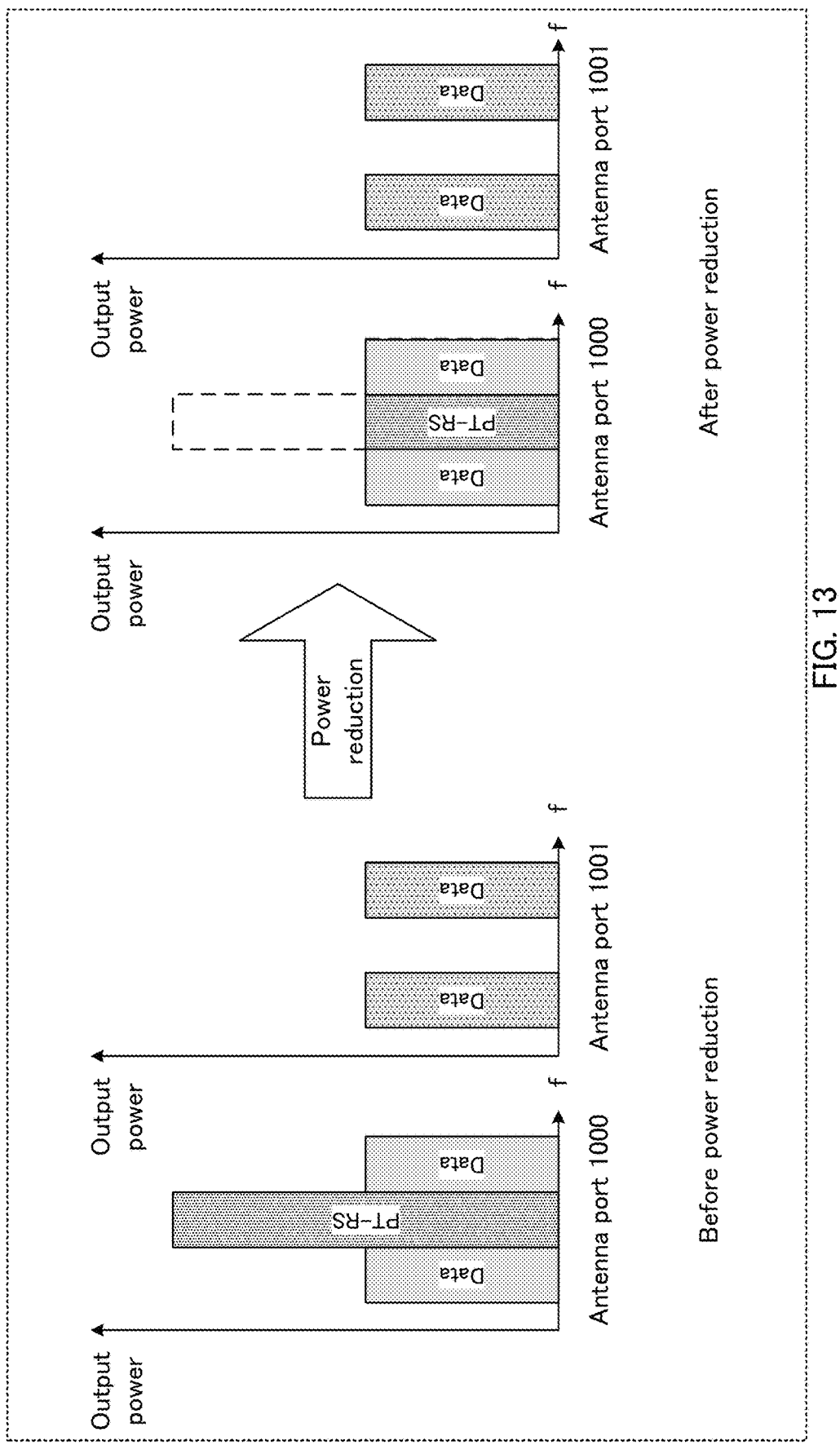
FIG. 13 is a diagram illustrating an exemplary transmission power adjustment according to Operation Example 5 of Embodiment 1.

FIG. 13 illustrates an example of transmission power adjustment in Operation Example 5.

As illustrated in FIG. 13, transmitter 100 reduces the transmission power for PT-RS to the transmission power for the data signal in the PT-RS port (antenna port 1000). That is, transmitter 100 reduces the transmission power for PT-RS and does not reduce the transmission power for the data signal in the PT-RS port.

In other words, as illustrated in FIG. 13, transmitter 100 sets the power ratio $\rho_{PTRS,i}=1$ between the data and PT-RS, and transmits the PT-RS with the same "power per antenna port, per RE" as the data. In other words, transmitter 100 releases power boosting of PT-RS.

Thus, the transmission power for the data signal is not reduced, so that it is made possible to prevent degradation of the reception accuracy of data in receiver 200.

Note that, in FIG. 13, the case has been described in which the transmission power for PT-RS is reduced to the transmission power for the data signal, but without limitation to this case, transmitter 100 may reduce the transmission power for PT-RS such that the transmission power for PT-RS does not to exceed the maximum transmission power of the PT-RS port. That is, the transmission power for PT-RS after adjustment may be larger or smaller than the transmission power for the data signal.

Operation Examples 1 to 5 have been described, thus far.

As described above, in this embodiment, transmitter 100 transmits a data signal with a defined transmission power while subjecting PT-RS to power boosting and transmitting the PT-RS, when performing non-coherent transmission or partial coherent transmission. At this time, in a case where the remaining power for transmission with the configured transmission power is not sufficient, transmitter 100 adjusts the transmission power within a range not exceeding the maximum transmission power for each antenna port.

That is, transmitter 100 configures the transmission power for PT-RS and a signal (such as data) to be transmitted simultaneously with the PT-RS within a range not exceeding the maximum transmission power for each antenna port. This configuration of transmission power may include application and release of power boosting of PT-RS. Further, in a case where the transmission power configured in a PT-RS port exceeds the maximum transmission power for the PT-RS port, transmitter 100 adjusts the transmission power to be less than or equal to the maximum transmission power for each antenna port.

Thus, transmitter 100 is capable of transmitting PT-RS with the highest possible transmission power within a range not exceeding the maximum transmission power for each antenna port, in accordance with the remaining power of transmitter 100 even in a transmission for which power cannot be adjusted between antenna ports as in non-coherent transmission or partial coherent transmission. Thus, the noise estimation accuracy can be improved in receiver 200, and the improvement of the transmission speed/transmission efficiency can be expected.

Further, transmitter 100 adjusts the transmission power such that the transmission power falls within a range not exceeding the maximum transmission power for each antenna port, thereby making it possible to prevent transmission with a power lower than the intended power or prevent a signal from being distorted in a case where the remaining amount of the transmission power of transmitter 100 is small.

Note that how the transmission power configuration method described above (e.g., Operation Examples 1 to 5) is performed may be dependent on implementation of transmitter 100. For example, transmitter 100 may apply any method of Operation Examples 1 to 5 described above and adjust the transmission power, and/or may select any method of Operation Examples 1 to 5 described above and adjust the transmission power, in accordance with the radio state or the conditions.

In addition, transmitter 100 may cancel the configuration of the transmission power reduction in a case where the remaining power of transmitter 100 increases, for example, after the transmission power is reduced as in Operation Examples 1 to 5 described above.

Further, in the present embodiment, the calculation method of the ratio $\rho_{PTRS,i}$ indicated in Equation 2 is not limited to the above description, and another method may be used.

Embodiment 2

In the present embodiment, a description will be given of a case where a transmitter, (i.e., mobile station) subjects PT-RS to power boosting and transmits the PT-RS in uplink. Further, in the present embodiment, the base station (receiver) indicates, to the mobile station, whether or not adjustment of the transmission power described in Embodiment is required.

[Overview of Communication System]

The communication system according to the present embodiment includes mobile station 300 (transmitter) and base station 400 (receiver). PT-RS is transmitted from mobile station 300 to base station 400.

[Configuration of Mobile Station]

Figure 14:
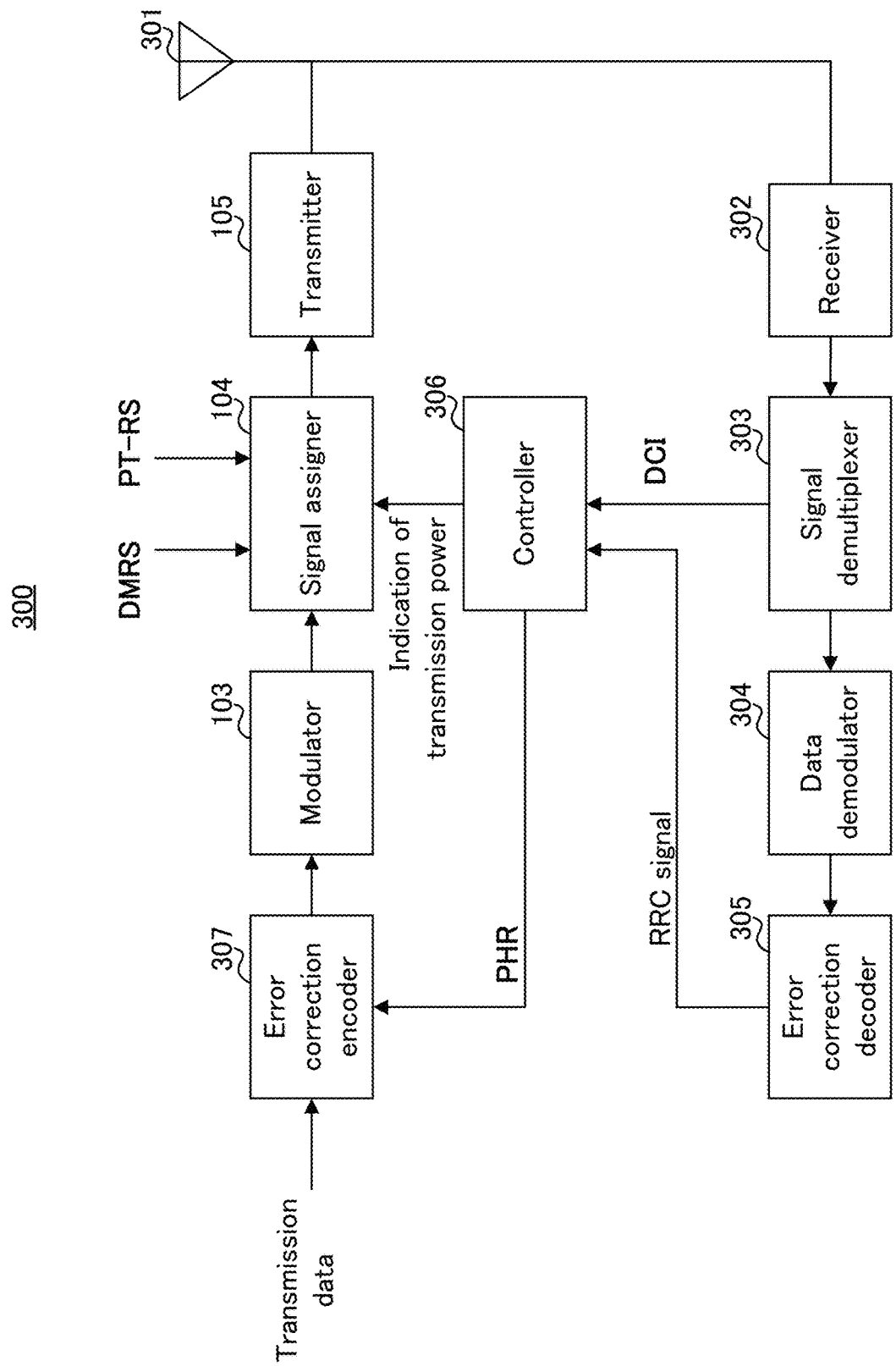
FIG. 14 is a block diagram illustrating a configuration example of a transmitter according to Embodiment 2.

FIG. 14 is a block diagram illustrating a configuration of mobile station 300 (transmitter) according to the present embodiment. In FIG. 14, the same components as those of Embodiment 1 (FIG. 6) are denoted by the same reference numerals, and their descriptions are omitted. Specifically, in addition to the configuration of transmitter 100 illustrated in FIG. 6, mobile station 300 illustrated in FIG. 14 further includes receiver 302, signal demultiplexer 303, data demodulator 304, and error correction decoder 305. Further, operations of antenna 301, controller 306 and error correction encoder 307 differ partly from the operations of antenna 106, controller 101 and error correction encoder 102 illustrated in FIG. 6.

Antenna 301 radiates the signal to be inputted from transmitter 105 toward base station 400. Further, antenna 301 receives the signal transmitted from base station 400 and outputs the received signal to receiver 302.

Receiver 302 applies radio reception processing, such as frequency conversion, to the received signal to be inputted from antenna 301, and outputs the signal after the radio reception processing to signal demultiplexer 303.

Signal demultiplexer 303 demultiplexes DCI and a data signal from the signal to be inputted from receiver 302, and outputs the DCI to controller 306 and outputs the data signal to data demodulator 304.

Data demodulator 304 demodulates the data signal to be inputted from signal demultiplexer 303 and outputs the demodulation signal to error correction decoder 305.

Error correction decoder 305 decodes the demodulation signal to be inputted from data demodulator 304, extracts an RRC signal from the resultant received data signal, and outputs the RRC signal to controller 306.

Controller 306 calculates a Power Headroom (PH) indicating the remaining transmission power of mobile station 300, generates a Power Headroom Report (PHR) to be reported to base station 400, and outputs the PHR to error correction encoder 307. In addition, controller 306 determines the transmission power for a transmission signal, such as a data signal and PT-RS, based on the information contained in the DCI to be inputted from signal demultiplexer 303 and the information contained in the RRC signal to be inputted from error correction decoder 305. The DCI or RRC signal may include, for example, information indicating whether or not adjustment of the transmission power is required (or information indicating adjustment of the transmission power). Controller 306 outputs the determined transmission power information to signal assigner 104.

Error correction encoder 307 applies error correction coding to the transmission data signal to be inputted or the PHR to be inputted from controller 306 and output the signal resulting from the error correction coding to modulator 103.

[Configuration of Base Station]

Figure 15:
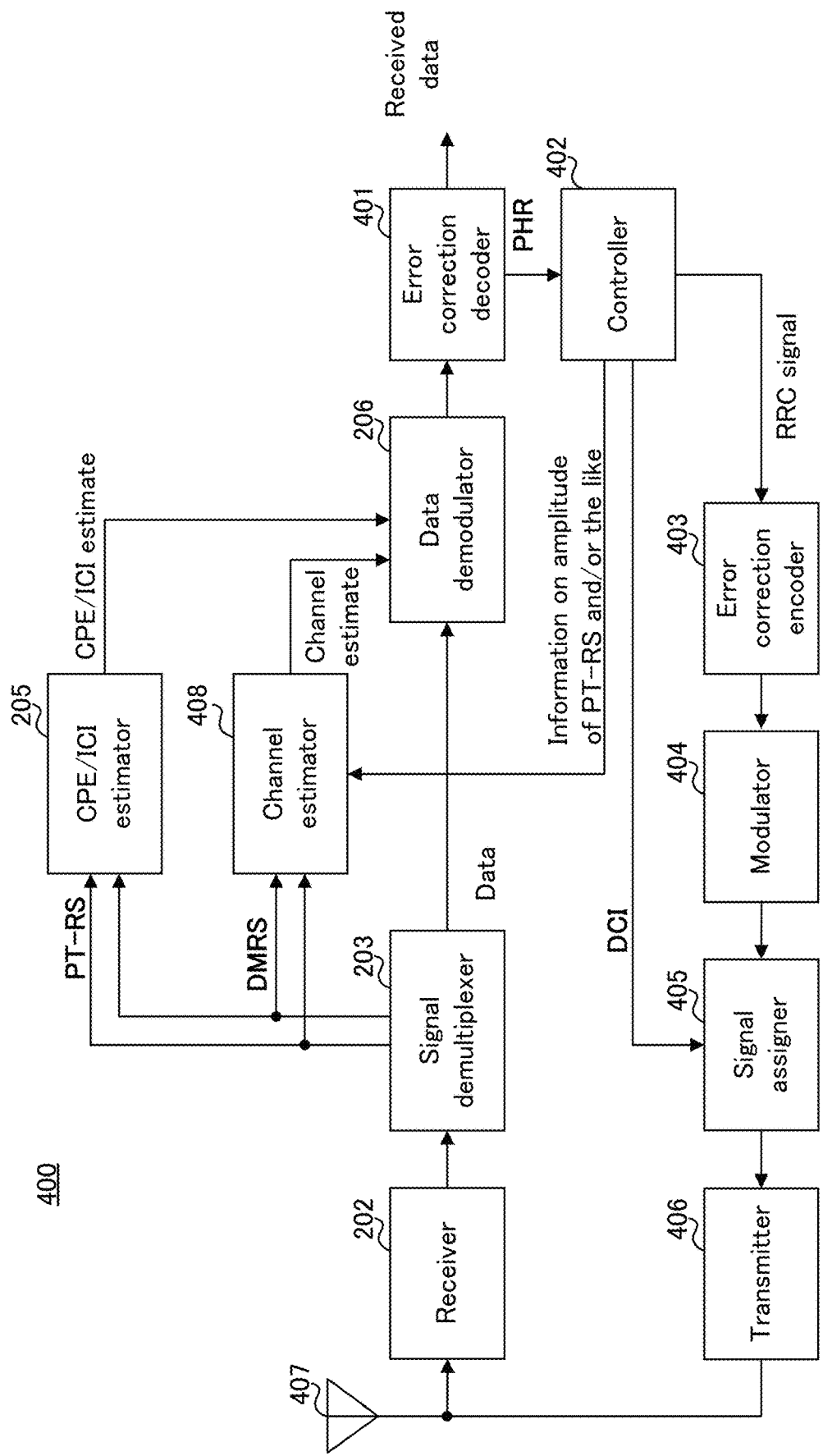
FIG. 15 is a block diagram illustrating a configuration example of a receiver according to Embodiment 2.

FIG. 15 is a block diagram illustrating a configuration of base station 400 (receiver) according to the present embodiment. Note that, in FIG. 15, the same components as those of Embodiment 1 (FIG. 7) are denoted by the same reference numerals, and their descriptions are omitted. Specifically, base station 400 illustrated in FIG. 15 further includes controller 402, error correction encoder 403, modulator 404, signal assigner 405, and transmitter 406 in addition to the configuration of receiver 200 illustrated in FIG. 7. Further, operations of antenna 407, channel estimator 408, and error correction decoder 401 differ partly from the operations of antenna 201, channel estimator 204, and error correction decoder 207 illustrated in FIG. 7.

Error correction decoder 401 decodes the demodulation signal to be inputted from data demodulator 206 and outputs the resultant received data signal. Further, error correction decoder 401 extracts the PHR from the data signal and outputs the PHR to controller 402.

Controller 402 determines whether or not mobile station 300 is to apply the transmission power control (transmission power adjustment) described in Embodiment 1 based on the PHR to be inputted from error correction decoder 401. In addition, controller 402 determines, for example, a signal waveform, modulation coding scheme (MCS), and allocation band to be applied to data transmission in mobile station 300. Controller 402 generates, based on the determination result and determined content, a DCI (i.e., dynamic signaling) and RRC signal (i.e., higher layer signaling), and outputs the DCI to signal assigner 405 and outputs the RRC signal to error correction encoder 403.

Further, controller 402 outputs, to channel estimator 408, "information on amplitude of PT-RS and/or the like" indicating whether or not the transmission power control described in Embodiment 1 is applied to the signal received from mobile station 300, based on the determination result regarding whether or not the transmission power adjustment is required. The information on amplitude of PT-RS and/or the like may include, for example, information on the amplitude (power) ratio of PT-RS and the data signal after the transmission power adjustment.

Error correction encoder 403 applies error correction coding to the RRC signal to be inputted from controller 402 and outputs the signal resulting from the error correction coding to modulator 404.

Modulator 404 performs modulation processing on the signal to be inputted from error correction encoder 403 and outputs the signal after the modulation processing to signal assigner 405.

Signal assigner 405 maps the signal to be inputted from modulator 404 and the DCI to be inputted from controller 402 to the time and frequency domain and outputs the signal after the mapping to transmitter 406.

Transmitter 406 applies radio transmission processing, such as frequency conversion using a carrier wave to the signal to be inputted from signal assigner 405, and outputs the signal after the radio transmission processing to antenna 407.

Antenna 407 receives the signal transmitted from mobile station 300 (see FIG. 14) and outputs the received signal to receiver 202. Antenna 407 radiates (transmits) the signal to be inputted from transmitter 406 toward mobile station 300.

Channel estimator 408 performs channel estimation, using DMRS to be inputted from signal demultiplexer 203. At this time, channel estimator 408 may perform channel estimation, using PT-RS. When PT-RS is used, channel estimator 408 may determine the amplitude (power) ratio between PT-RS and the data signal based on the information on amplitude of PT-RS and/or the like to be inputted from controller 402. Channel estimator 408 outputs the channel estimate (channel information) to data demodulator 206. Note that, in a case where no PT-RS is used in channel estimation performed by channel estimator 408, the information on amplitude of PT-RS and/or the like need not be inputted to channel estimator 408.

[Operations of Mobile Station 300 and Base Station 400]

Next, operations of mobile station 300 and base station 400 will be described in detail.

Mobile station 300 performs a non-coherent transmission or partial coherent transmission, using a high frequency band and a high modulation order in uplink.

Base station 400 determines whether or not "the remaining power for transmission with the configured transmission power in a PT-RS port is insufficient," that is, whether or not the transmission power adjustment is required in mobile station 300.

Then, base station 400 indicates to mobile station 300 to apply the transmission power adjustment described in Embodiment 1 in a case where the remaining power for transmitting the signal with the configured transmission power is not sufficient in the PT-RS port. That is, in a case where an indication for transmission power adjustment from base station 400 is present, mobile station 300 adjusts the transmission power such that the transmission power is less than or equal to the maximum transmission power for each antenna port, as described in Embodiment 1.

Hereinafter, specific Operation Examples 1 and 2 of mobile station 300 and base station 400 will be described.

Operation Example 1

In Operation Example 1, mobile station 300 first calculates the transmission power for the data signal, using a parameter and/or the like indicated from base station 400. In addition, mobile station 300 determines the transmission power for every RE in a PT-RS port, using the ratio $\rho_{PTRS,i}$ indicated in Equation 2. That is, mobile station 300 applies power boosting to PT-RS.

Next, mobile station 300 calculates a PH. The PH is, for example, a value resulting from subtracting the transmission power for the data signal in all the antenna ports calculated above from the maximum transmission power of the entirety of mobile station 300. Then, mobile station 300 reports the calculated PH to base station 400 as a PHR.

When the value of the received PHR is less than a threshold value, base station 400 determines that there is no sufficient remaining power in the PT-RS port in mobile station 300 and indicates adjustment (reduction) of transmission power to mobile station 300 as described in Embodiment 1. This indication may be given explicitly or implicitly by an RRC signal or a DCI.

In a case where an indication for transmission power adjustment is present, as described in Embodiment 1, mobile station 300 reduces the transmission power for PT-RS or a data signal and transmits the PT-RS and data signal and/or the like after the adjustment to base station 400.

Thus, in Operation Example 1, in a case where the PHR to be calculated using the maximum transmission power of the entirety of mobile station 300 and the transmission power for the data signal is less than a threshold value, base station 400 indicates adjustment of the transmission power to mobile station 300. This allows a PHR similar to LTE to be used in the transmission power control, so that the configuration to be additionally implemented in mobile station 300 and base station 400 for transmission power control can be reduced.

Note that, the description has been given of the case where the PHR represents the remaining power in all the antenna ports of mobile station 300, but there is no limitation to this case. For example, the PHR may be a value resulting from subtracting the transmission power for the data signal in a PT-RS port from the maximum transmission power in the PT-RS port. That is, in a case where the PHR to be calculated using the maximum transmission power in the PT-RS port of mobile station 300 and the transmission power for the data signal is less than the threshold, adjustment of the transmission power is indicated from base station 400 to mobile station 300, transmitter. As a result, base station 400 is allowed to know the transmission power state of the PT-RS port in a more detailed manner, so that base station 400 can more accurately determine whether or not the transmission power needs to be reduced, and can appropriately provide an indication to mobile station 300.

Operation Example 2

In Operation Example 2, as in Operation Example 1, mobile station 300 first calculates the transmission power for the data, using a parameter and/or the like indicated from base station 400. In addition, mobile station 300 determines the transmission power for every RE in a PT-RS port, using the ratio $\rho_{PTRS,i}$ indicated in Equation 2. That is, mobile station 300 applies power boosting to PT-RS.

Meanwhile, base station 400 indicates, to mobile station 300, at least one of a waveform (e.g., CP-OFDM or DFT-S-OFDM), MCS, and band (e.g., the number of PRBs) used for transmission of the data signal.

Mobile station 300 determines whether or not to perform the transmission power adjustment as described in Embodiment 1, based on at least one of the waveform, MCS, and the band indicated from base station 400.

For example, in a case where the indicated waveform is "DFT-S-OFDM," as described in Embodiment 1, mobile station 300 reduces the transmission power for PT-RS or a data signal and transmits the PT-RS and data signal and/or the like after the adjustment to base station 400. This is because, in a case where the indicated waveform is DFT-S-OFDM (i.e., single carrier waveform), the transmission power is likely to be extremely large because mobile station 300 is likely to be positioned on a cell edge.

Further, when the indicated MCS is "MCS of a level lower than the threshold value," mobile station 300 reduces the transmission power for PT-RS and the data signal and transmits the PT-RS and data signal after adjustment to base station 400 as described in Embodiment 1. This is because, in a case where the indicated MCS is an MCS of a lower level than the MCS within a range of an MCS of a higher level with which PT-RS is transmitted, mobile station 300 is likely to be forced to perform transmission to base station 400 in a noisy environment, and thus, the transmission power is likely to be high.

Further, when the indicated band is "broader than the threshold value," mobile station 300 reduces the transmission power for PT-RS and the data signal and transmits the PT-RS and data signal after adjustment to base station 400 as described in Embodiment 1. This is because the transmission power for data increases depending on the allocated band, and therefore, when the indicated band is broader than a certain value, there is a high possibility that the transmission power is large.

In this manner, mobile station 300 may determine whether or not to perform transmission power adjustment based on any one of a waveform, MCS and band used for data transmission or a plurality of parameters.

That is, base station 400 implicitly indicates, to mobile station 300, the presence or absence of application of transmission power control as described in Embodiment 1, by the indication of at least one of a waveform, MCS, and band. This implicit indication does not require the use of PHRs as described in Operation Example 1 in the transmission power control. For this reason, the configuration to be additionally implemented in mobile station 300 and base station 400 for transmission power control can be reduced.

Operation Examples 1 and 2 have been described, thus far.

As described above, in the present embodiment, mobile station 300 transmits a data signal with a defined transmission power and subjects PT-RS to power boosting, and transmits the PT-RS in non-coherent transmission or partial coherent transmission. In a case where base station 400 determines that the remaining power for transmission with the configured transmission power is not sufficient in the PT-RS port of mobile station 300, base station 400 indicates, to mobile station 300, adjustment for the transmission power within a range not exceeding the maximum transmission power for each antenna port. Mobile station 300 performs a transmission power control in accordance with the instruction of base station 400.

Thus, mobile station 300 is capable of transmitting PT-RS with the highest possible transmission power within a range not exceeding the maximum transmission power for each antenna port, in accordance with the remaining power of mobile station 300 even in a transmission for which power cannot be adjusted between antenna ports as in non-coherent transmission or partial coherent transmission as in Embodiment 1. Thus, improvement in the transmission speed/transmission efficiency by improving the noise estimation accuracy can be expected in base station 400.

Further, mobile station 300 adjusts the transmission power such that the transmission power falls within a range not exceeding the maximum transmission power for each antenna port, thereby making it possible to prevent transmission with a power lower than the intended power and/or prevent a signal from being distorted in a case where the remaining amount of the transmission power of mobile station 300 is small.

Further, in the present embodiment, since base station 400 indicates transmission power adjustment to mobile station 300, mobile station 300 and base station 400 can communicate with each other in a state where recognition of the transmission power between mobile station 300 and base station 400 is the same.

Embodiment 3

In the present embodiment, a description will be given of a case where a transmitter (i.e., mobile station) subjects PT-RS to power boosting and transmits the PT-RS in uplink. Further, in the present embodiment, the mobile station determines whether or not adjustment of the transmission power is required as described in Embodiment 1.

[Overview of Communication System]

The communication system according to the present embodiment includes mobile station 500 (transmitter) and base station 600 (receiver). PT-RS is transmitted from mobile station 500 to base station 600.

[Configuration of Mobile Station]

Figure 16:
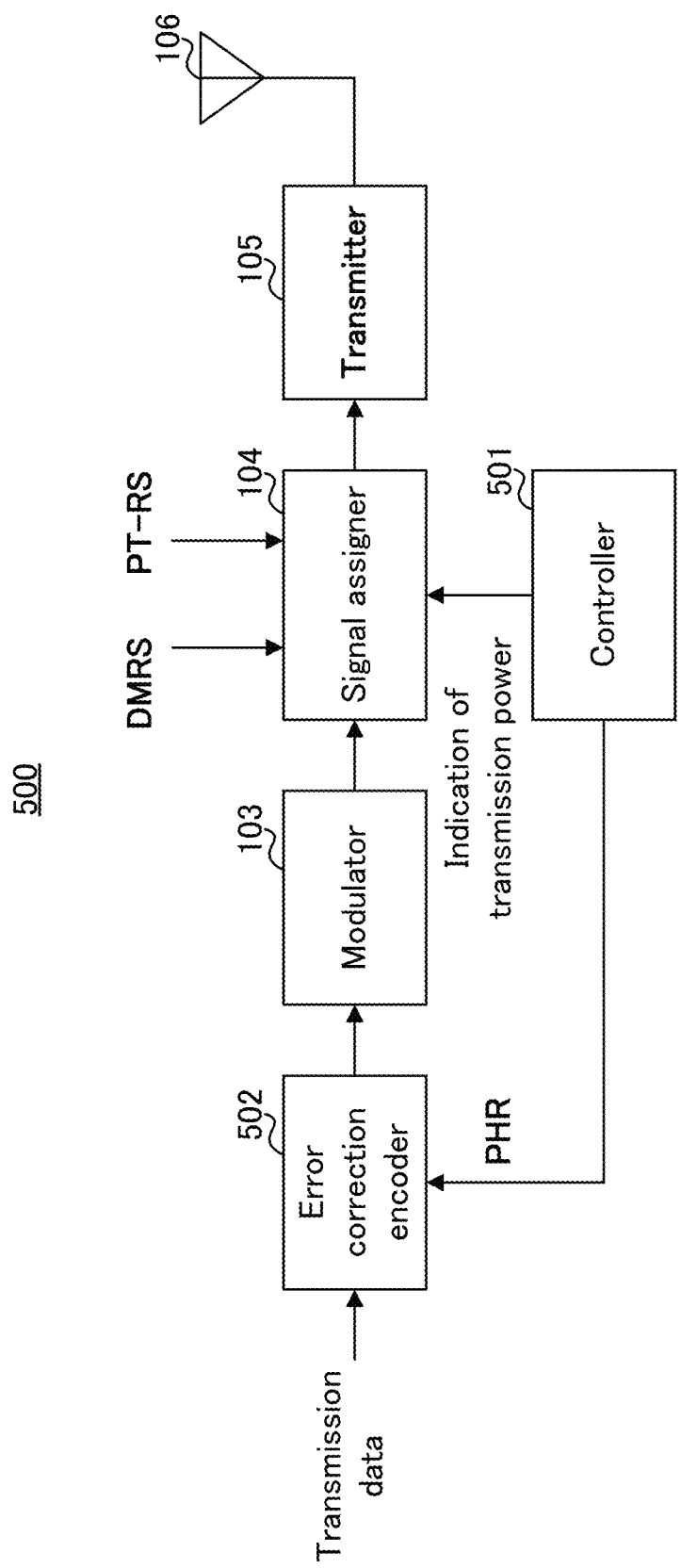
FIG. 16 is a block diagram illustrating a configuration example of a transmitter according to Embodiment 3.

FIG. 16 is a block diagram illustrating a configuration of mobile station 500 (transmitter) according to the present embodiment. In FIG. 16, the same components as those of Embodiment 1 (FIG. 6) are denoted by the same reference numerals, and their descriptions are omitted. Specifically, operations of controller 501 and error correction encoder 502 differ partly from the operations of controller 101 and error correction encoder 102 illustrated in FIG. 6.

Controller 501 calculates the PH indicating the remaining transmission power of mobile station 500, generates a PHR to be reported to base station 600, and outputs the PHR to error correction encoder 502. Further, controller 501 determines whether or not the transmission power control (transmission power adjustment) described in Embodiment 1 is to be applied, based on the calculated value of the PH. Then, controller 501 determines the transmission power for a transmission signal, such as a data signal and PT-RS, in accordance with the result of determination. Controller 501 outputs the determined transmission power information to signal assigner 104.

Error correction encoder 502 applies error correction coding to the transmission data signal to be inputted or the PHR to be inputted from controller 501 and output the signal resulting from the error correction coding to modulator 103.

[Configuration of Base Station]

Figure 17:
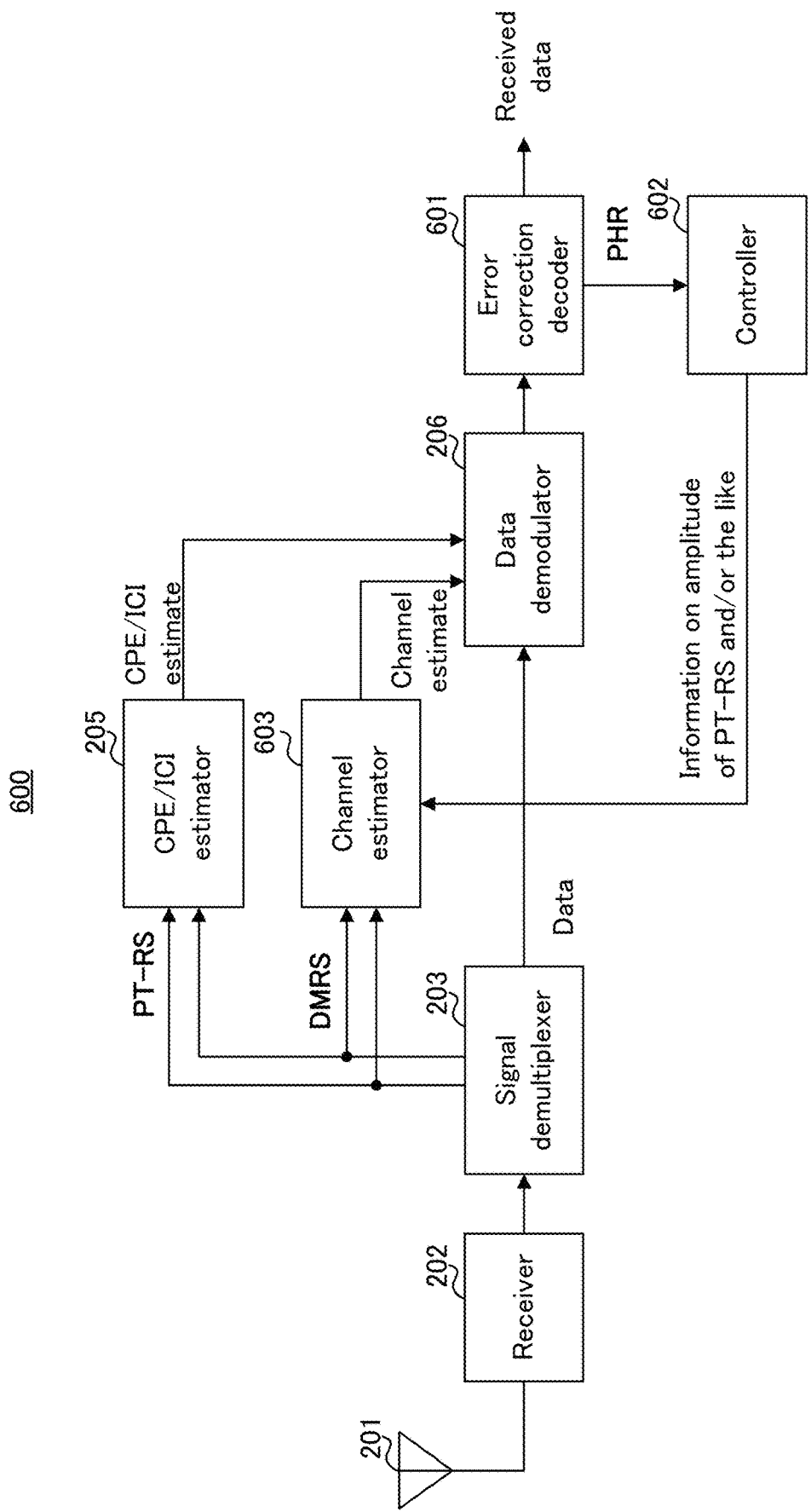
FIG. 17 is a block diagram illustrating a configuration example of a receiver according to Embodiment 3.

FIG. 17 is a block diagram illustrating a configuration of base station 600 (receiver) according to the present embodiment. In FIG. 17, the same components as those of Embodiment 1 (FIG. 7) are denoted by the same reference numerals, and their descriptions are omitted. Specifically, base station 600 illustrated in FIG. 17 further includes controller 602 in addition to the configuration of receiver 200 illustrated in FIG. 7. Further, operations of channel estimator 603 and error correction decoder 601 are different from the operations of channel estimator 204 and error correction decoder 207 illustrate in FIG. 7.

Error correction decoder 601 decodes the demodulation signal to be inputted from data demodulator 206 and outputs the resultant received data signal. Error correction decoder 601 extracts the PHR from the data signal and outputs the PHR to controller 602.

Controller 602 determines whether or not mobile station 500 applies the transmission power control described in Embodiment 1, based on the PHRs inputted from error correction decoder 601. Further, controller 602 outputs, to channel estimator 603, "information on amplitude of PT-RS and/or the like" indicating whether or not the transmission power control described in Embodiment 1 is applied to the signal received from mobile station 500, based on the result of determination.

Channel estimator 603 performs channel estimation, using DMRS to be inputted from signal demultiplexer 203. At this time, channel estimator 603 may perform channel estimation, using PT-RS. When PT-RS is used, channel estimator 603 may determine the amplitude (power) ratio between PT-RS and the data signal based on the information on amplitude of PT-RS and/or the like to be inputted from controller 602. Channel estimator 603 outputs the channel estimate (channel information) to data demodulator 206.

Note that, in a case where no PT-RS is used in channel estimation by channel estimator 603, the configuration of base station 600 may be omitted, and the base station may have the same configuration as receiver 200 illustrated in FIG. 7.

[Operations of Mobile Station 500 and Base Station 600]

Next, operations of mobile station 500 and base station 600 will be described in detail.

Mobile station 500 performs non-coherent transmission or partial coherent transmission, using a high frequency band and a high modulation order in uplink.

Further, mobile station 500 determines whether or not "the remaining power for transmission with the configured transmission power in a PT-RS port is insufficient," that is, whether or not the transmission power adjustment is required.

Then, mobile station 500 performs the transmission power adjustment described in Embodiment 1 in a case where the remaining transmission power for transmitting the signal with the configured transmission power is not sufficient in the PT-RS port.

Meanwhile, base station 600 determines whether or not "the remaining power for transmission with the configured transmission power in a PT-RS port is insufficient" as with mobile station 500. Then, in a case where the remaining power for transmitting a signal with the configured transmission power is not sufficient in the PT-RS port, base station 600 determines that the signal is transmitted in mobile station 500 after application of the transmission power control described in Embodiment 1. In this case, base station 600 performs channel estimation in considering, for example, that the transmission power for PT-RS or the data signal is reduced.

Hereinafter, a specific operation example of mobile station 500 and base station 600 will be described.

In the operation example, mobile station 500 first calculates the transmission power for the data signal, using a parameter and/or the like indicated from base station 600. In addition, mobile station 500 determines the transmission power for every RE in the PT-RS port, using the ratio $\rho_{PTRS,i}$ indicated in Equation 2. That is, mobile station 500 applies power boosting to PT-RS.

Next, mobile station 500 calculates a PH.

The PH is, for example, a value resulting from subtracting the transmission power for the data signal in all the antenna ports calculated above from the maximum transmission power of the entirety of mobile station 500. Then, mobile station 500 reports the calculated PH to base station 600 as a PHR.

Further, when the calculated value of PH is less than a threshold value, mobile station 500 determines that the remaining power is not sufficient in the PT-RS port of mobile station 500, reduces the transmission power for PT-RS or the data signal, as described in Embodiment 1, and transmits the PT-RS and data signal and/or the like after the adjustment to base station 600.

Likewise, in a case where the value of PHR to be reported from mobile station 500 is less than a threshold value, base station 600 determines that the transmission power adjustment as described in Embodiment 1 has been applied to the received data signal or PT-RS, and performs channel estimation taking the reduction of transmission power into consideration.

Thus, in the operation example, in a case where the PHR to be calculated using the maximum transmission power of the entirety of mobile station 500 and the transmission power for the data signal is less than a threshold value, mobile station 500 adjusts the transmission power, and base station 600 determines that adjustment for transmission power is performed in mobile station 500. This allows a PHR similar to LTE to be used in the transmission power control, so that the configuration to be additionally implemented in mobile station 500 and base station 600 for transmission power control can be reduced.

Note that, the description has been given of the case where the PHR represents the remaining power in all the antenna ports of mobile station 500, but there is no limitation to this case. For example, the PHR may be a value resulting from subtracting the transmission power for the data signal in a PT-RS port from the transmission power for a data signal in the PT-RS port. That is, in a case where the PHR calculated using the maximum transmission power in the PT-RS port of mobile station 500 and the transmission power for the data signal is less than the threshold value, mobile station 500 adjusts the transmission power. As a result, mobile station 500 and base station 600 are allowed to know the transmission power state of the PT-RS port in a more detailed manner, so that mobile station 500 and base station 600 can more accurately determine whether or not the transmission power needs to be reduced.

The operation example has been described, thus far.

As described above, in the present embodiment, mobile station 500 transmits a data signal with a defined transmission power, subjects PT-RS to power boosting and transmits the PT-RS in non-coherent transmission or partial coherent transmission. In this case, in a case where mobile station 500 determines that the remaining power for transmission with the configured transmission power is not sufficient in the PT-RS port of mobile station 500, mobile station 500 adjusts the transmission power within a range not exceeding the maximum transmission power for each antenna port.

This allows mobile station 500 to transmit PT-RS with the highest possible transmission power within a range not exceeding the maximum transmission power for each antenna port, in accordance with the remaining power of mobile station 500 even in a transmission for which power cannot be adjusted between antenna ports as in non-coherent transmission or partial coherent transmission as in Embodiment 1. Thus, improvement in the transmission speed/transmission efficiency by improving the noise estimation accuracy in base station 600 can be expected.

Further, mobile station 500 adjusts the transmission power such that the transmission power falls within a range not exceeding the maximum transmission power for each antenna port, thereby making it possible to prevent transmission with a power lower than the intended power or prevent a signal from being distorted in a case where the remaining amount of the transmission power of mobile station 500 is small.

Further, in the present embodiment, mobile station 500 determines whether or not to adjust transmission power, thereby enabling configuration of an appropriate transmission power without waiting for an indication of base station 600.

Each embodiment of the present disclosure has been described, thus far.

Other Embodiments (1) The term "CPE/ICI correction" used in the above embodiments means "correcting CPE," "correcting ICI," or "correcting both CPE and ICI."

(2) Although the above embodiments mainly assume uplink transmission, the transmission power control described above may also be applied to downlink transmission.

(3) In the above embodiments, non-coherent transmission and partial coherent transmission are assumed, but the content of the present disclosure can be applied to methods other than these transmissions.

(4) In the above embodiments, the description has been given of the case of transmitting data, using two antenna ports (1000, 1001), as an example. However, the number of antenna ports for transmitting data is not limited to two, and the number of antenna ports other than two may be used. However, it is assumed that power boosting of PT-RS is not applied when the number of antenna ports from which data can be transmitted is one, because "use of the power of resources not used by another antenna port" is impossible.

Further, although the description has been given of the case where PT-RS is mapped for one antenna port, the number of antenna ports for which PT-RS is mapped is not limited to one. The number of antenna ports for which PT-RS is mapped may be two or more.

(5) The PHR used in Embodiments 2 and 3 may be transmitted periodically in time or may be transmitted each time the remaining transmission power changes. In addition, application and release of the reduction of transmission power described in Embodiment 1 may be switched each time the remaining transmission power surplus changes.

(6) When control channels (Physical Downlink Control Channel (PDCCH)) and Physical Uplink Control Channel (PUCCH)), and data channels (Physical Downlink Shared Channel (PDSCH)) and (Physical Uplink Shared Channel (PUSCH)) are frequency-multiplexed, PT-RS may be mapped to this symbol.

(7) In the above embodiments (FIG. 1), the length of slot is assumed to be 14 symbols, but the length of slot is not limited to 14 symbols, and for example, the length of slot may be 7 symbols or another number of symbols.

(8) The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

(9) The present disclosure can be implemented in apparatuses, devices, and systems of any kind, each being provided with a communication function, (collectively referred to as "communication apparatuses"). Non-limiting examples of the communication apparatuses include telephones (such as portable phones and smartphones), tablets, personal computers (PCs) (such as laptops, desktops, and notebooks), cameras (such as digital still/video cameras), digital players (such as digital audio/video players), wearable devices (such as wearable cameras, smartwatches, and tracking devices), game consoles, digital book readers, telehealth telemedicine (remote healthcare medicine prescription) devices, communication-function-equipped vehicles or transportation (such as automobiles, airplanes and ships), and a combination of the above mentioned apparatuses of various kinds.

The communication apparatuses are not limited to portable or mobile apparatuses and thus include unportable or fixed apparatuses, devices, and systems of any kind, such as smart home devices (e.g., appliances, lighting equipment, smart meters or measuring instruments, and control panels), vending machines, and Internet of Things ("IoT" (every "things" that may exist on networks.

(10) In addition to data communication via cellular systems, wireless LAN systems, communication satellite systems and/or the like, communication includes data communication via a combination of these systems.

(11) Moreover, the communication apparatuses include devices, such as controllers or sensors to be connected to or linked to a communication device which executes communication functions described in the present disclosure. Controllers or sensors are included, for example, each of which is configured to generate a control signal and/or a data signal used by the communication device which executes the communication functions of the communication apparatuses.

(12) Further, the communication apparatuses include infrastructure equipment which performs communication with the above-mentioned non-limiting apparatuses of various kinds or which controls these non-limiting apparatuses of various kinds, such as base stations, access points, apparatuses of any other kinds, devices, and systems.

A transmitter according to the present disclosure includes: control circuitry, which, in operation, determines a transmission power for a phase tracking reference signal (PT-RS) and a data signal within a range not exceeding a maximum transmission power for each antenna port; and transmission circuitry, which, in operation, transmits the PT-RS and the data signal with the determined transmission power.

In the transmitter according to the present disclosure, the control circuitry adjusts the transmission power to be less than or equal to the maximum transmission power for each antenna port in a case where the transmission power configured in a first antenna port from which the PT-RS is transmitted exceeds the maximum transmission power of the first antenna port.

In the transmitter according to the present disclosure, the control circuitry reduces the transmission power for the PT-RS and the data signal transmitted from all antenna ports while maintaining a power ratio between the PT-RS and the data signal.

In the transmitter according to the present disclosure, the control circuitry reduces the transmission power in the first antenna port and does not reduce the transmission power in another antenna port except for the first antenna port.

In the transmitter according to the present disclosure, the control circuitry reduces the transmission power for the PT-RS and the data signal transmitted from the first antenna port while maintaining the power ratio between the PT-RS and the data signal.

In the transmitter according to the present disclosure, the control circuitry reduces the transmission power for the data signal and does not reduce the transmission power for the PT-RS in the first antenna port.

In the transmitter according to the present disclosure, the control circuitry reduces the transmission power for part of resource elements to which the data signal is mapped and does not reduce the transmission power for the data signal and the PT-RS which are mapped to other resource elements, except for the part of the resource elements in the first antenna port.

In the transmitter according to the present disclosure, the control circuitry reduces the transmission power for the PT-RS and does not reduce the transmission power for the data signal in the first antenna port.

In the transmitter according to the present disclosure, the transmitter is a mobile station, and the control circuitry adjusts the transmission power to be less than or equal to the maximum transmission power for each antenna port in a case where an indication from a base station is present.

In the transmitter according to the present disclosure, adjustment of the transmission power is indicated from the base station to the transmitter in a case where a Power Headroom Report (PHR) calculated using a maximum transmission power of an entirety of the transmitter and the transmission power for the data signal is less than a threshold value.

In the transmitter according to the present disclosure, adjustment of the transmission power is indicated from the base station to the transmitter in a case where a Power Headroom Report (PHR) calculated using a maximum transmission power in an antenna port of the transmitter from which the PT-RS is transmitted and the transmission power for the data signal is less than a threshold value.

In the transmitter according to the present disclosure, the control circuitry determines whether or not to perform adjustment of the transmission power, based on at least one of a signal waveform, a modulation coding scheme, and an allocated band indicated by the base station.

In the transmitter according to the present disclosure, the transmitter is a mobile station, and the control circuitry adjusts the transmission power to be less than or equal to the maximum transmission power for each antenna port.

In the transmitter according to the present disclosure, the control circuitry adjusts the transmission power in a case where a Power Headroom Report (PHR) calculated using the maximum transmission power of an entirety of the transmitter and the transmission power for the data signal is less than a threshold value.

In the transmitter according to the present disclosure, the control circuitry adjusts the transmission power in a case where a Power Headroom Report (PHR) calculated using the maximum transmission power in an antenna port of the transmitter from which the PT-RS is transmitted and the transmission power for the data signal is less than a threshold value.

A transmission method according to the present disclosure includes: determining a transmission power for a phase tracking reference signal (PT-RS) and a data signal within a range not exceeding a maximum transmission power for each antenna port; and transmitting the PT-RS and the data signal with the determined transmission power.

The disclosure of Japanese Patent Application No. 2018-025861, filed on Feb. 16, 2018, including the specification, drawings, and abstract is incorporated herein by reference in its entirety.

INDUSTRIAL APPLICABILITY

One exemplary embodiment of the present disclosure is useful in mobile communication systems.

REFERENCE SIGNS LIST

100, 300, 500 Transmitter
101, 306, 402, 501, 602 Controller
102, 307, 403, 502 Error correction encoder
103, 404 Modulator
104, 405 Signal assigner
105, 406 Transmitter
106, 201, 301, 407 Antenna
200, 400, 600 Receiver
202, 302 Receiver
203, 303 Signal demultiplexer
204, 408, 603 Channel estimator
205 CPE/ICI estimator
206, 304 Data demodulator
207, 305, 401, 601 Error correction decoder

The invention claimed is:

1. A transmission apparatus, comprising:
   circuitry, which, in operation, adjusts a transmission power of a phase tracking reference signal (PT-RS) using a power ratio between the PT-RS and a data signal, wherein the power ratio between the PT-RS and the data signal for a defined number of layers is changed in case of a non-coherent transmission and in case of a partial coherent transmission; and
   a transmitter, which, in operation, transmits the PT-RS at the adjusted transmission power.

2. The transmission apparatus according to claim 1, wherein the circuitry, in operation, adjusts the transmission power of the PT-RS to be less than or equal to a maximum transmission power of an antenna port from which the PT-RS is transmitted.

3. The transmission apparatus according to claim 1, wherein the circuitry, in operation, based on an indication, adjusts the transmission power of an antenna port from which the PT-RS is transmitted and does not adjust a transmission power of another antenna port.

4. The transmission apparatus according to claim 1, wherein the circuitry, in operation, determines, based on an indication, whether or not the transmission power of the PT-RS is adjusted.

5. The transmission apparatus according to claim 1, wherein the circuitry, in operation, adjusts the transmission power in a case where a Power Headroom Report (PHR), which is calculated using a maximum transmission power of the transmitter and a transmission power of the data signal, is less than a threshold value.

6. The transmission apparatus according to claim 1, wherein the circuitry, in operation, adjusts the transmission power in a case where a Power Headroom Report (PHR), which is calculated using a maximum transmission power of an antenna port from which the PT-RS is transmitted and a transmission power of the data signal, is less than a threshold value.

7. The transmission apparatus according to claim 1, wherein the circuitry, in operation, determines, based on at least one of a signal waveform, a modulation coding scheme, and an allocated band indicated by the base station, whether or not to adjust the transmission power per resource element (RE) of the PT-RS to be larger than a transmission power per RE of the data signal.

8. A transmission method, comprising:
   adjusting a transmission power of a phase tracking reference signal (PT-RS) using a power ratio between the PT-RS and a data signal, wherein the power ratio between the PT-RS and the data signal for a defined number of layers is changed in case of a non-coherent transmission and in case of a partial coherent transmission; and
   transmitting the PT-RS at the adjusted transmission power.

9. The transmission method according to claim 8, wherein the adjusting includes adjusting the transmission power of the PT-RS to be less than or equal to a maximum transmission power of an antenna port from which the PT-RS is transmitted.

10. The transmission method according to claim 8, wherein the adjusting includes, based on an indication, adjusting the transmission power of an antenna port from which the PT-RS is transmitted and not adjusting a transmission power of another antenna port.

11. The transmission method according to claim 8, comprising determining, based on an indication, whether or not the transmission power of the PT-RS is adjusted.

12. The transmission method according to claim 8, wherein the adjusting includes adjusting the transmission power in a case where a Power Headroom Report (PHR), which is calculated using a maximum transmission power of the transmitter and a transmission power of the data signal, is less than a threshold value.

13. The transmission method according to claim 8, wherein the adjusting includes adjusting the transmission power in a case where a Power Headroom Report (PHR), which is calculated using a maximum transmission power of an antenna port from which the PT-RS is transmitted and a transmission power of the data signal, is less than a threshold value.

14. The transmission method according to claim 8, comprising determining, based on at least one of a signal waveform, a modulation coding scheme, and an allocated band indicated by the base station, whether or not to adjust the transmission power per resource element (RE) of the PT-RS to be larger than a transmission power per RE of the data signal.

\* \* \* \* \*